United States Patent
Seto et al.

(10) Patent No.: US 9,444,997 B2
(45) Date of Patent: *Sep. 13, 2016

(54) IMAGE PROCESSING APPARATUS, IMAGE CAPTURE DEVICE, AND COMPUTER PROGRAM

(71) Applicant: Panasonic Intellectual Property Management Co., Ltd., Osaka (JP)

(72) Inventors: Akira Seto, Osaka (JP); Yoshinori Okazaki, Osaka (JP); Tsutomu Mukai, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/724,120

(22) Filed: May 28, 2015

(65) Prior Publication Data

US 2015/0288873 A1 Oct. 8, 2015

Related U.S. Application Data

(63) Continuation of application No. 13/798,433, filed on Mar. 13, 2013, now Pat. No. 9,077,954.

(30) Foreign Application Priority Data

Mar. 14, 2012 (JP) ................................ 2012-057029

(51) Int. Cl.
*H04N 5/77* (2006.01)
*H04N 5/232* (2006.01)
(Continued)

(52) U.S. Cl.
CPC ......... *H04N 5/23216* (2013.01); *G11B 27/034* (2013.01); *G11B 27/102* (2013.01);
(Continued)

(58) Field of Classification Search
CPC .............. H04N 1/2112; H04N 5/772; H04N 2101/00; H04N 9/8042; G11B 27/105
USPC .......................................................... 386/225
See application file for complete search history.

(56) References Cited

U.S. PATENT DOCUMENTS

| 9,013,603 | B2 | 4/2015 | Nakagawa et al. | |
| 2009/0207263 | A1* | 8/2009 | Mizuno | H04N 5/772 348/220.1 |
| 2011/0026902 | A1* | 2/2011 | Nguyen | H04N 5/76 386/295 |

FOREIGN PATENT DOCUMENTS

| JP | 2002-142189 A | 5/2002 |
| JP | 2006-129170 A | 5/2006 |

(Continued)

OTHER PUBLICATIONS

Co-pending U.S. Appl. No. 13/798,500, filed Mar. 13, 2013 (application and current claims provided).

(Continued)

*Primary Examiner* — William C Vaughn, Jr.
*Assistant Examiner* — Daniel Tekle
(74) *Attorney, Agent, or Firm* — Renner, Otto, Boisselle & Sklar, LLP

(57) ABSTRACT

An image processing apparatus according to the present disclosure includes: an image processor configured to generate movie data based on image capturing data obtained in response to a shooting instruction that has been given by a user; and a controller configured to write the movie data on a storage medium. When any movie file has already been written on the storage medium, and when the movie data is related to the existent movie file or when the user decides to add the movie data, the controller adds the movie data to the existent movie file.

12 Claims, 17 Drawing Sheets

(51) Int. Cl.
*H04N 9/79* (2006.01)
*H04N 9/82* (2006.01)
*G11B 27/034* (2006.01)
*G11B 27/32* (2006.01)
*H04N 21/41* (2011.01)
*H04N 21/4223* (2011.01)
*H04N 21/433* (2011.01)
*H04N 21/4335* (2011.01)
*G11B 27/10* (2006.01)

(52) U.S. Cl.
CPC ............. *G11B27/322* (2013.01); *H04N 5/772* (2013.01); *H04N 9/79* (2013.01); *H04N 9/7921* (2013.01); *H04N 9/8205* (2013.01); *H04N 21/4126* (2013.01); *H04N 21/4223* (2013.01); *H04N 21/4334* (2013.01); *H04N 21/4335* (2013.01)

(56) References Cited

FOREIGN PATENT DOCUMENTS

| | | |
|---|---|---|
| JP | 2008-301357 A | 12/2008 |
| JP | 2009-200559 A | 9/2009 |
| JP | 2010-288207 A | 12/2010 |
| JP | 2011-060391 A | 3/2011 |
| JP | 2011-082915 A | 4/2011 |

OTHER PUBLICATIONS

Co-pending U.S. Appl. No. 14/152,359, filed Jan. 10, 2014 (application provided).

* cited by examiner

FIG. 7

| CONTENT ID | CONTENT TYPE | DIGEST MOVIE ID | REAL FILE NAME | CHAPTER INFORMATION | | CHAPTER TITLE | RELATION INFORMATION | | SHOOTING INFORMATION | | | | | |
|---|---|---|---|---|---|---|---|---|---|---|---|---|---|---|
| | | | | START TIME | END TIME | | ASSOCIATED CONTENT ID | BEFORE/ AFTER INFORMATION | DATE AND TIME OF SHOOTING | MODE | GPS | SHOOTING POSTURE | FLASH | MAGNITUDE OF CAMERA SHAKE |
| D1-P1 | Picture | D1 | D1G001.JPG | — | — | | D1-C1b<br>D1-C1a | — | JAN-1-2012 10:00:00 | PORTRAIT | NORTH LATITUDE: NN EAST LONGITUDE: EE | HORIZONTAL | ON | 50 |
| D1-C1b | Video | D1 | DIG001.MP4 | 0:00:00 | 0:00:05 | | D1-P1 | BEFORE | JAN-1-2012 10:00:00 | PORTRAIT | NORTH LATITUDE: NN EAST LONGITUDE: EE | HORIZONTAL | ON | 50 |
| D1-C1a | Video | D1 | DIG001.MP4 | 0:00:05 | 0:00:10 | | D1-P1 | AFTER | JAN-1-2012 10:00:05 | PORTRAIT | NORTH LATITUDE: NN EAST LONGITUDE: EE | HORIZONTAL | ON | 50 |

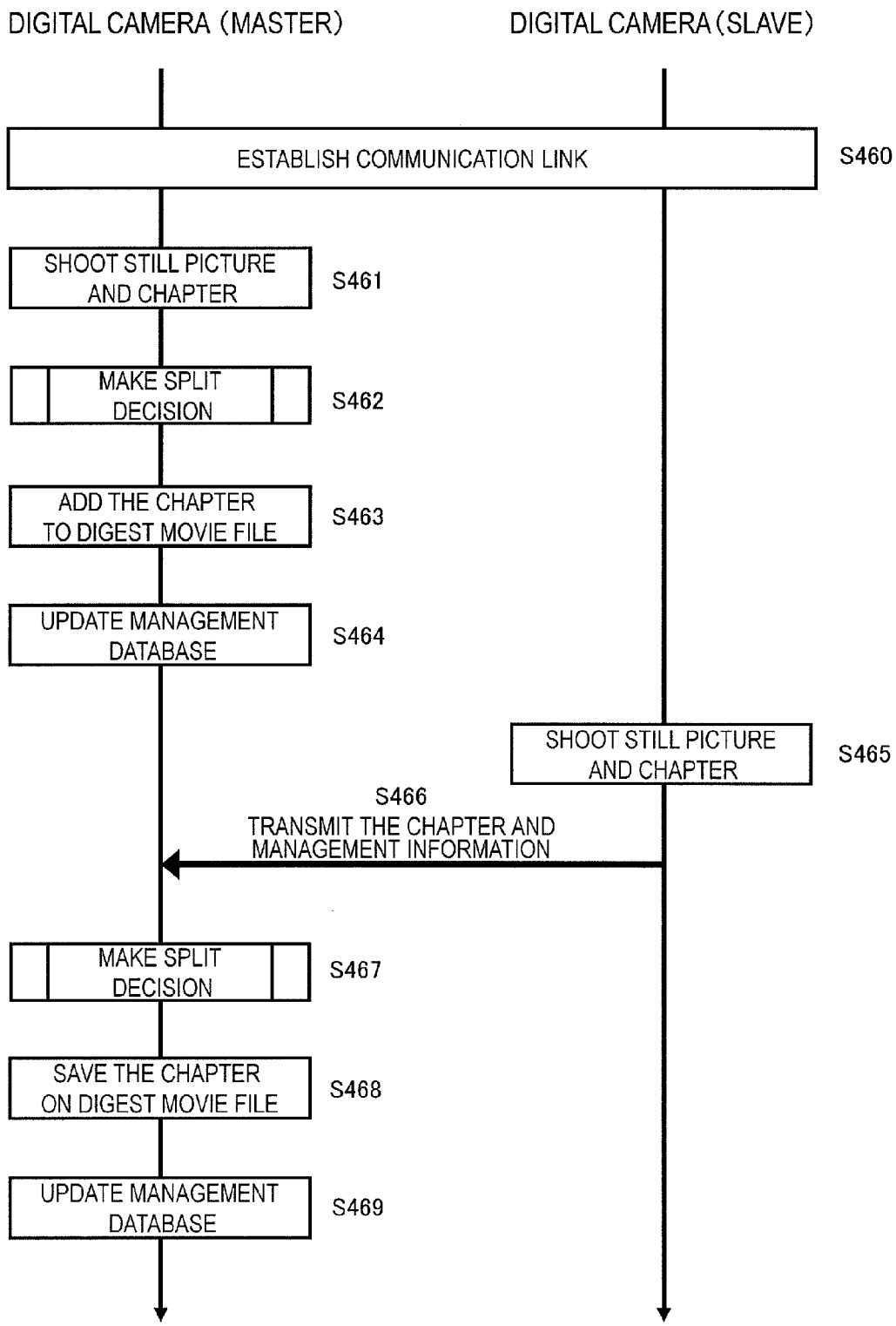

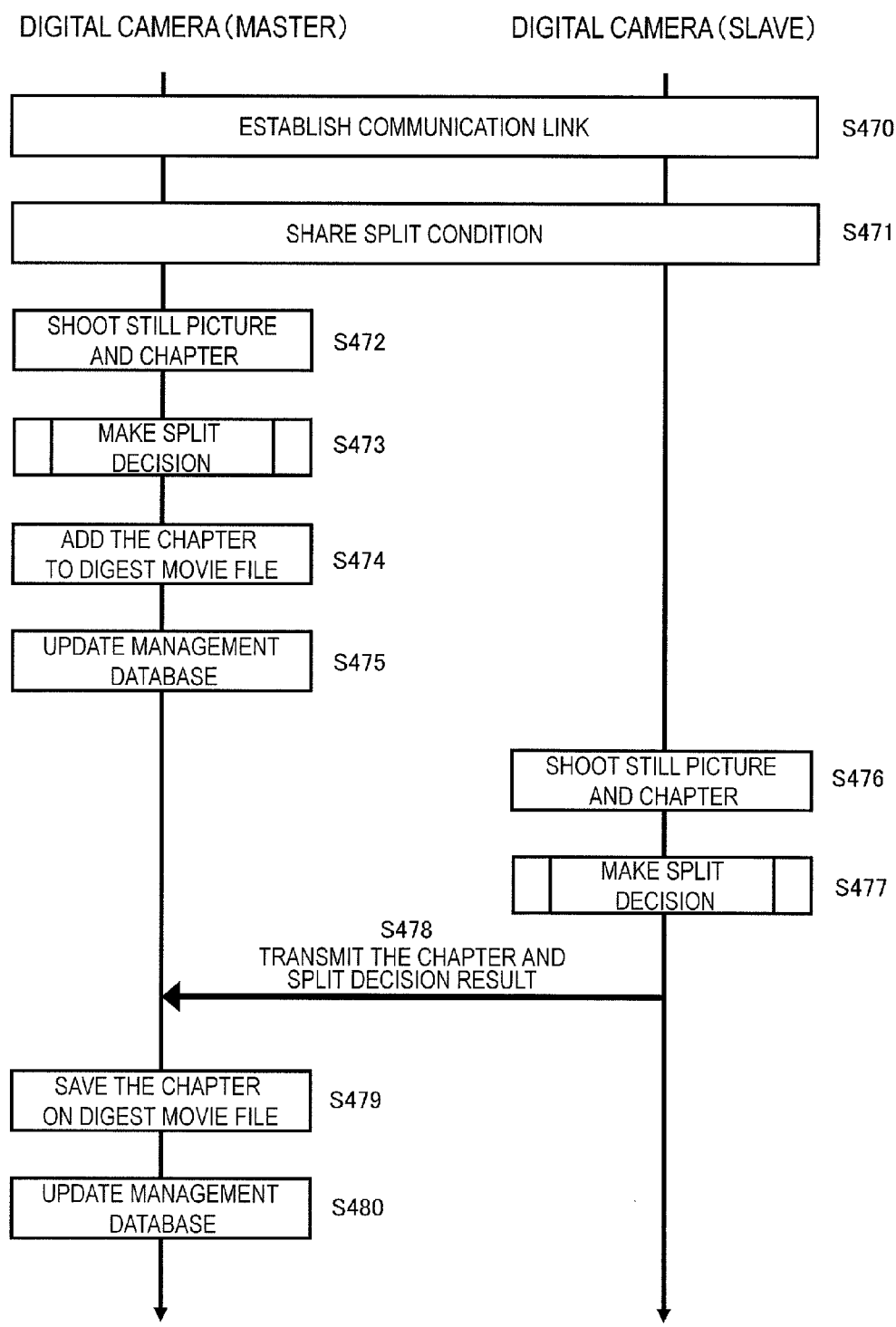

IMAGE PROCESSING APPARATUS, IMAGE CAPTURE DEVICE, AND COMPUTER PROGRAM

BACKGROUND

1. Technical Field

The present disclosure relates to an electronic device that processes a movie.

2. Description of the Related Art

An image capture device that can generate a digest movie as a digest of a movie that has been shot is known.

For example, Japanese Laid-Open Patent Publication No. 2009-200559 discloses an image capture device that generates a single still picture and a movie stream as a digest movie when the shutter release key is pressed while a movie is being shot.

SUMMARY

One non-limiting, and exemplary embodiment provides an image processing apparatus and image capture device that generates a more favorable digest movie for the user.

In one general aspect, an image processing apparatus according to the present disclosure includes: an image processor configured to generate movie data based on image capturing data obtained in response to a shooting instruction that has been given by a user; and a controller configured to write the movie data on a storage medium. When any movie file has already been written on the storage medium, and when the movie data is related to the existent movie file or when the user decides to add the movie data, the controller adds the movie data to the existent movie file.

According to the above aspect, it is possible to generate a more favorable digest movie for the user.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 7 schematically illustrates an exemplary list of information to be managed in a management database.

FIG. 18 is a sequence diagram showing a procedure in which chapters are just added to an existent digest movie file or saved on a newly generated one using multiple digital cameras.

FIG. 19 is a sequence diagram showing another procedure in which chapters are just added to an existent digest movie file or saved on a newly generated one using multiple digital cameras.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Figure 1:
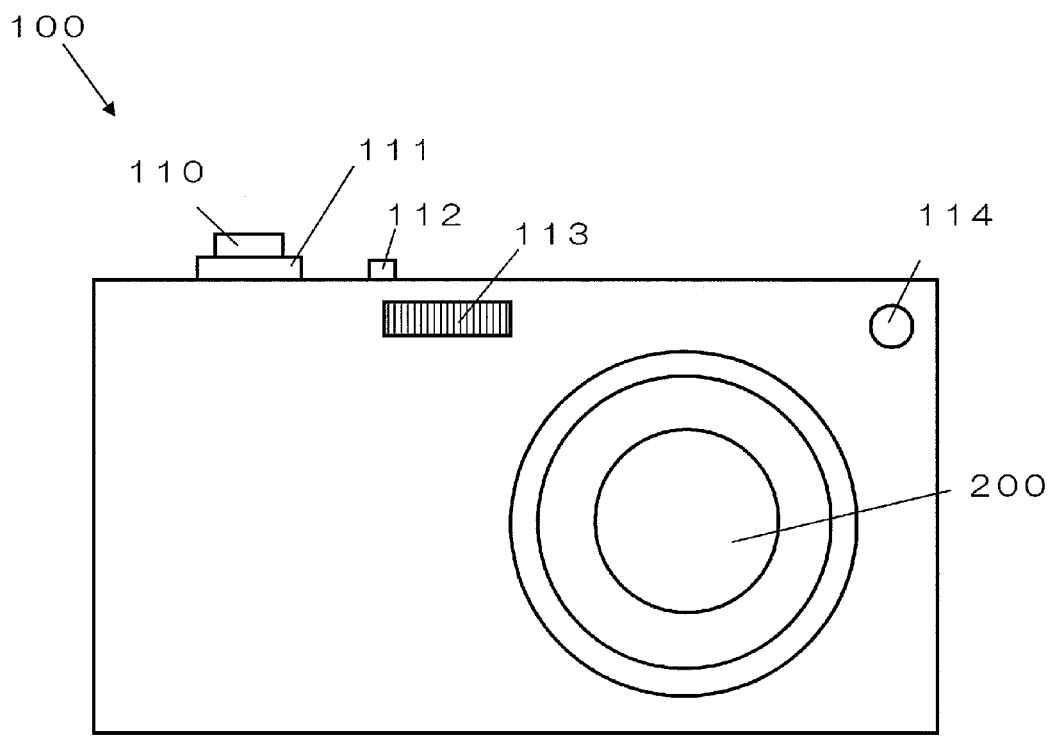
FIG. 1 is a front view of a digital camera 100.
Figure 2:
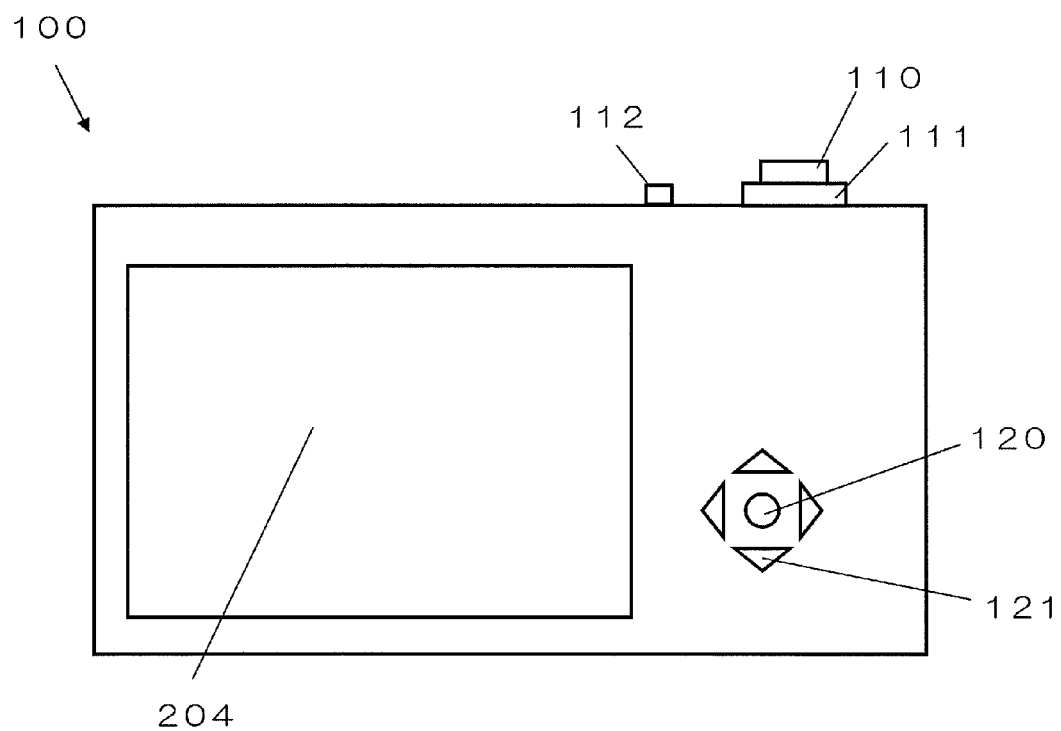
FIG. 2 is a rear view of the digital camera 100.
Figure 3:
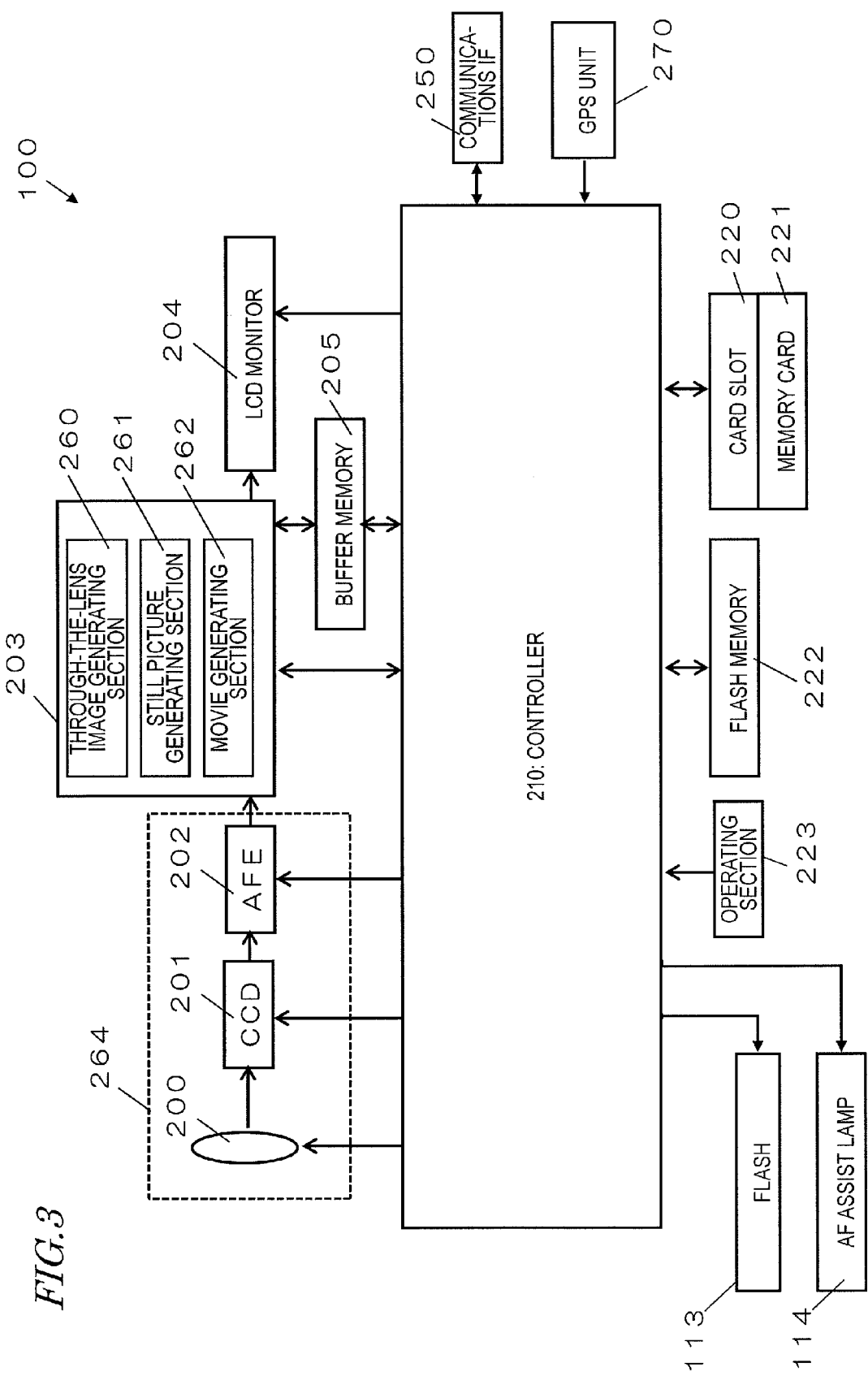
FIG. 3 is a block diagram illustrating the electrical configuration of the digital camera 100.

FIGS. 1 and 2 are schematic representations illustrating the configuration of a digital camera (image capture device) 100 as a first embodiment on its front side and on its rear side, respectively. FIG. 3 is a block diagram generally illustrating an internal configuration for the digital camera 100.

The digital camera 100 of this embodiment has multiple modes including shooting modes, a playback mode and a setting mode. The shooting modes include a normal shooting mode and a digest movie recording mode. In the digest movie recording mode, the digital camera 100 continuously writes movie data on a buffer memory 205. And as soon as a user's instruction (e.g., an instruction to shoot a still picture that has been given by pressing a release button 110 or an instruction to make a digest movie) is received during that continuous recording, the digital camera 100 selects parts of the movie data that has been written on the buffer memory 205 for a predetermined period around the time of instruction and records those selected parts as a digest movie file. Specifically, when triggered by the instruction to shoot a still picture, the digital camera 100 writes movie data for a few seconds just before the still picture is shot, movie data for a few seconds right after the still picture has been shot, or movie data for a few seconds just before and right after the still picture has been shot on a storage medium such as a memory card 221. Alternatively, the digital camera 100 may also write movie data for a few seconds just before and/or right after an instruction to record a digest movie has been given on a storage medium such as the memory card 221 without shooting a still picture.

In this description, a single unit of movie data to be captured during the predetermined period of time (e.g., just before and right after the timing to shoot a still picture) will be referred to herein as a "chapter". Every time a chapter is recorded, a decision is made whether the chapter satisfies a predetermined condition or not. If the answer is YES, the chapter is combined with the previous chapters that have been written there so far, thus forming a single movie file to be recorded. A movie file thus formed will be referred to herein as a "digest movie file". To update such a digest movie file that has been written with the contents of a new chapter will be referred to herein as "adding" that chapter to the digest movie file. Every time a chapter is newly generated, the controller 210 of the digital camera 100 determines whether that chapter should be added to the old digest movie file or saved on a new digest movie file separately. Such a decision will be referred to herein as a "split decision".

For example, if a chapter is supposed to be generated in response to an instruction to shoot a still picture, the digital camera 100 generates management information for either a chapter generated or a still picture associated with that chapter. And based on that management information, the digital camera 100 makes the split decision. As a result, a more favorable digest movie can be generated for the user. Even in generating a chapter without responding to such an instruction to shoot a still picture, the digital camera 100 can also make the split decision by reference to management information associated with that chapter.

Hereinafter, the configuration and operation of the digital camera 100 of this embodiment will be described more specifically.

1-1. Configuration

First of all, the configuration of the digital camera 100 of this embodiment will be described with reference to FIGS. 1 through 3.

As shown in FIG. 1, the digital camera 100 includes a lens barrel to house an optical system 200 in, a flash 113, and an AF (autofocus) assist lamp 114 on its front side. The digital camera 100 also includes a release button 110, a zoom lever 111 and a power button 112, on the top. As shown in FIG. 2, the digital camera 100 includes an LCD monitor 204, a menu button 120 and cross buttons 121, on its rear side. In this description, those members that accept the user's instruction, including the release button 110, the zoom lever 111, the power button 12, the menu button 120 and the cross buttons 121 will be collectively referred to herein as an "operating section".

FIG. 3 illustrates how respective components of this digital camera 100 are electrically connected together. The digital camera 100 includes an image capturing section 264, an image processor 203, an LCD monitor 204, a buffer memory 205, a controller 210, a flash (strobe light source) 113, an AF assist lamp 114, an operating section 223, a flash memory 222, a card slot 220, a communications interface (IF) 250, and a GPS unit 270. The image capturing section 264 includes an optical system 200, a CCD image sensor 201, and an AFE (analog front end) 202. The image processor 203 includes a through-the-lens image generating section 260, a still picture generating section 261, and a movie generating section 262. Although the memory card 221 is illustrated in FIG. 3, the memory card 221 does not form part of this digital camera 100 but is a removable storage medium which is connectible to the card slot 220.

The digital camera 100 makes the CCD image sensor 201 convert into an electrical signal (i.e., capture) the subject image that has been produced through the optical system 200. Then, the CCD image sensor 201 generates image capturing data based on the subject image that has been produced on the image capturing plane. The image capturing data thus generated is subjected to various kinds of processing by the AFE 202 and the image processor 203 to be image data. The image data thus generated is then written on storage media including the flash memory 222 and the memory card 221. And an image represented by the image data that has been written on the flash memory 222 and the memory card 221 is displayed on the LCD monitor 204 in accordance with the instruction given by the user who is operating this digital camera 100 using the operating section 223.

Hereinafter, the respective components of the digital camera 100 shown in FIGS. 1 to 3 will be described in detail one by one.

The optical system 200 includes a focus lens, a zoom lens, a diaphragm and a shutter. Optionally, the optical system 200 may further include an OIS (optical image stabilizer) lens as well. It should be noted that this optical system 200 may include any other number of lenses and may be made up of any number of groups of lenses. The focus lens, the zoom lens, the diaphragm, and the shutter are driven by their associated drivers (such as a DC motor or a stepping motor) in accordance with a control signal supplied from the controller 210.

The CCD image sensor 201 is an imager which generates image capturing data based on the subject image that has been produced by the optical system 200. The CCD image sensor 201 generates image data for a new frame at regular time intervals. Also, the CCD image sensor 201 adjusts the degree of exposure by performing an electronic shuttering operation. Optionally, any other type of image sensor such as a CMOS image sensor or an NMOS image sensor may be used instead of the CCD image sensor 201.

The AFE 202 is connected to the CCD image sensor 201 and subjects the image capturing data, which has been generated by the CCD image sensor 201, to correlated double sampling, gain control, and other kinds of processing. Also, the AFE 202 converts the analog image capturing data into digital image capturing data and then outputs the image capturing data thus converted to the image processor 203.

The image processor 203 is connected to the AFE 202, receives the image capturing data from the AFE 202 and subjects the image capturing data to various kinds of processing, thereby generating image data. Examples of those various kinds of processing include gamma correction, white balance correction, luminance and color difference (YC) conversion, electronic (or digital) zooming, compression and expansion. However, these are just examples. Based on the image capturing data provided by the AFE 202, the image processor 203 can extract the feature point of a particular subject from an image area specified by the image capturing data and can make a decision on the subject. For example, if the feature point of some person's face is added to a list in advance, then the image processor 203 can recognize that person's face.

The image processor 203 may be implemented as a digest signal processor (DSP) or a microcontroller, for example. The image processor 203 may be implemented as either only a set of hardware circuits or a combination of hardware and software (computer program). The image processor 203 includes a through-the-lens image generating section 260, a still picture generating section 261, a movie generating section 262 and other image generating sections.

The through-the-lens image generating section 260 generates image data to be displayed on the LCD monitor 204 based on the image capturing data provided sequentially by the AFE 202 (at a rate of 60 frames per second, for example). Looking at the real-time video displayed on the LCD monitor 204, the user can determine easily the angle of view of shooting and other parameters.

Based on the image capturing data obtained at the timing when the release button 110 is pressed down, the still picture generating section 261 generates a still picture to be recorded. The still picture generating section 261 generates a still picture file compliant with the JPEG standard, for example. In generating a still picture file, the still picture generating section 261 adds management information about the still picture to that file. Examples of the management information includes an F value, a shutter speed, sensitivity, GPS information, information about the shooting mode, information indicating whether a picture has been shot with flashlight or not, and information indicating whether the AF assist lamp has been used or not. The still picture file that has been generated by the still picture generating section 261 is written by the controller 210 on the memory card 221. In writing the still picture file on the memory card 221, the controller 210 adds management information about the still picture file to a management database.

The movie generating section 262 generates movie data based on the image capturing data supplied from the image capturing section 264. Based on the image capturing data obtained between a point in time when a movie recording button (not shown) included in the operating section 223 was pressed down and a point in time when the movie recording button is pressed down again to stop recording, the movie generating section 262 generates a movie file to be recorded. The movie generating section 262 generates a movie file compliant with the AVCHD™ standard or the MP4 standard, for example. In addition, in the digest movie recording mode, the movie generating section 262 continuously generates movie data based on the image capturing data and writes the data on the buffer memory 205. And based on the image capturing data that has been obtained in a predetermined period around the timing when the release button 110 is pressed down (which will be sometimes referred to herein as "release timing"), the movie generating section 262 generates movie data (chapters). The predetermined period may be just before and right after the release timing, for example. The data of the movie files or chapters thus generated is written by the controller 210 on the memory card 221. In adding the chapters on the digest movie file in the memory card 221, the controller 210 adds management information about the chapters to the management database.

In the digest movie recording mode, the still picture generating section 261 generates a still picture file based on the image capturing data obtained when the release button 110 is pressed down. The controller 210 writes the still picture file thus generated on the memory card 221. In the meantime, based on the image capturing data obtained in a predetermined period around the timing when the release button 110 is pressed down (e.g., for a few seconds just before and right after the release timing), the movie generating section 262 generates movie data (chapters). The controller 210 adds the chapters thus generated to the digest movie file and writes them on the memory card 221. Also, the controller 210 associates the still picture file, the chapter, and the digest movie file to which the chapter has been added with each other if those files and chapter have been generated at substantially the same time, and writes them on the memory card 221. Specifically, by reference to the management database, the controller 210 associates those files and chapter if they have been generated at substantially the same time. The management database will be described in detail later with reference to FIG. 7.

The LCD monitor 204 is arranged at the rear of this digital camera 100 and displays an image based on the image data that has been processed by the image processor 203. The LCD monitor 204 may display not only an image but also various kinds of settings of this digital camera 100. The LCD monitor 204 may be replaced with an organic EL display or any other kind of display.

The controller 210 is a processor that controls the overall operation of this digital camera 100, and is suitably implemented as a combination of a ROM (read-only memory) to store a program and other sorts of information and a CPU (central processing unit) to process the program and other information. The ROM stores programs about an autofocus (AF) control and an autoexposure (AE) control and a program to control the overall operation of this digital camera 100.

The controller 210 may be implemented as a hardwired electronic circuit or a microcontroller, for example. Or the controller 210 and the image processor 203 may form a single semiconductor chip. Also, the ROM does not have to be one of the internal components of the controller 210 but may also be provided outside of the controller 210 as well. As shown in FIG. 3, the controller 210 is electrically connected to the other components and controls those components with control signals.

The controller 210 can perform an AF control. First of all, the controller 210 gets a contrast value in a particular subject area of the image data from the image processor 203. By getting such contrast values continuously, the controller 210 senses the focusing state in a particular subject area and drives the focus lens so as to focus on that subject area. The time for the controller 210 to carry out the AF control may be the time when the user's instruction given by pressing the release button 110 halfway through is accepted. Alternatively, the controller 210 may also be configured to carry out the AF control continuously throughout the shooting mode.

Information about the focusing state while a still picture is being shot is managed with the management database to be described later.

The controller 210 can also perform an autoexposure (AE) control. First of all, the controller 210 gets luminance information in a particular subject area of the image data from the image processor 203. In order to get an appropriate exposure of the subject, the controller 210 calculates exposure values based on pieces of luminance information that have been obtained continuously. Based on the exposure values calculated and a predetermined program diagram, the controller 210 determines an F value and a shutter speed. The program diagram is information that defines a relation between the exposure value, the F value, and the shutter speed and is stored in advance in a storage medium such as a ROM. By monitoring the luminance information to be obtained from the image data, the controller 210 performs the AE control continuously. The exposure value for shooting may be fixed either when the release button 110 is pressed halfway by the user or when the release button 110 is pressed fully by him or her. The F value, shutter speed, sensitivity and other kinds of information to be relied on when a still picture is going to be shot is managed using the management database to be described later.

The buffer memory 205 is a storage medium that functions as a work memory for the image processor 203 and the controller 210 and may be implemented as a DRAM (dynamic random access memory), for example. Meanwhile, the flash memory 222 functions as an internal memory to store the image data and other kinds of information.

The card slot 220 is an interface, to/from which the memory card 221 is readily insertable and removable, and can be connected to the memory card 221 both electrically and mechanically. Optionally, the card slot 220 may have the ability to control the memory card 221.

The memory card 221 is an external memory with an internal storage medium such as a flash memory, and can store data such as the image data to be processed by the image processor 203. In this embodiment, the memory card 221 is supposed to be used as an exemplary external memory. However, this is only an example. Alternatively, the external memory may also be a storage medium such as a hard disk or an optical disc.

The operating section 223 is a generic term that refers collectively to a number of operating buttons and dials that are arranged on the outer shell of this digital camera 100, and accepts the user's instructions. Specifically, the operating section 223 includes the release button 110, the zoom lever 111, the power button 112, the menu button 120 and the cross buttons 121 shown in FIGS. 1 and 2. On accepting the user's instruction, the operating section 223 sends various operation instruction signals to the controller 210.

The release button 110 is a two-stage press button that can be pressed down halfway and fully by the user. Specifically, when the release button 110 is pressed halfway by the user, the controller 210 performs the autofocus (AF) control and the autoexposure (AE) control described above, thereby determining the shooting condition. And when the release button 110 is pressed down fully by the user, the controller 210 writes the image data, (which may be a still picture or a chapter and) which has been captured and generated when the button is pressed down fully, on the memory card 221.

The menu button 120 is another press button. When the menu button 120 is pressed by the user, the controller 210 gets a menu displayed on the LCD monitor 204. The menu is displayed on the screen to allow the user to determine the settings of the shooting and playback conditions. The menu button 120 may also function as an ENTER button so that if the menu button 120 is pressed while the user is choosing one of the options of any of various condition setting items, that option is selected.

The cross buttons 121 are yet another set of press buttons, which are arranged over, under, and on the right and left of the menu button 120. By pressing any of these cross buttons 121, the user can choose one of the options of any of the various condition setting items that are being displayed on the LCD monitor 204.

The flash 113 includes a xenon tube, a capacitor, a booster, and a firing trigger circuit. In accordance with a control signal supplied from the controller 210, the booster applies a high voltage to the capacitor. Also in accordance with a control signal supplied from the controller 210, the firing trigger circuit discharges the high voltage that has been applied to, and stored in, the capacitor, thereby instantaneously emitting flash light from the xenon gas in the xenon tube synchronously with acceptance of the instruction to shoot a still picture. As a result, the digital camera 100 can shoot a still picture of the subject irradiated with the flashlight. By firing the flash 113 instantaneously with respect to the subject, the subject can be shot with the lack of brightness compensated for. Information indicating whether the flash has been fired or not while a still picture is being shot is managed by the management database to be described later.

The AF assist lamp 114 emits an AF assist light beam in order to compensate for the lack of illuminance of the subject and get the subject's contrast value while the controller 210 is performing the AF control described above. Particularly when the subject has low illuminance, it is difficult to get an AF controllable contrast value from the subject. With the AF assist light beam, however, the controller 210 can get an AF controllable contrast value in an increased number of scenes. Information indicating whether the AF assist light beam has been emitted or not during the AF control is managed by the management database to be described later.

The communications interface 250 is a wireless or wired communications interface. Through this communications interface 250, the controller 210 can be connected to other communications devices via an access pointer. The communications interface 250 may be implemented as a wireless LAN or a wired LAN, for example.

The GPS unit 270 is a GPS receiver which detects the current location of the digital camera 100 using the global positioning system by satellite. The controller 210 gets information about the current location (including the latitude and the longitude) via the GPS unit 270. The digital camera 100 can associate the current location information provided by the GPS unit 270 with the image shot (which may be either a still picture or a movie such as a chapter). Information about the current location while a still picture is being shot is managed by the management database to be described later.

As described above, this digital camera 100 includes: a movie generating section 262 which generates movie data (chapter) for a preset shooting period in response to an instruction to shoot a still picture that has been given by pressing the release button, and a controller 210 which adds the generated chapter to a digest movie file that has already been written on a memory card 221 if any digest movie file related to the chapter generated has already been written on the memory card 221.

It should be noted that the configuration described above is only an example and any other configuration could be adopted as well as long as the controller 210 can perform the operation to be described below. For example, the digital camera 100 may include some additional components other than the ones shown in FIG. 3 or may have some of its components omitted.

1-2. Operation

Hereinafter, it will be described with reference to FIGS. 4 through 16B exactly how this digital camera 100 operates.

First of all, it will be outlined how to perform a digest movie recording operation. In the following example, in response to an instruction to shoot a still picture, a movie is supposed to be recorded as chapters for a few seconds each before and after the timing when that instruction is issued.

Figure 4:
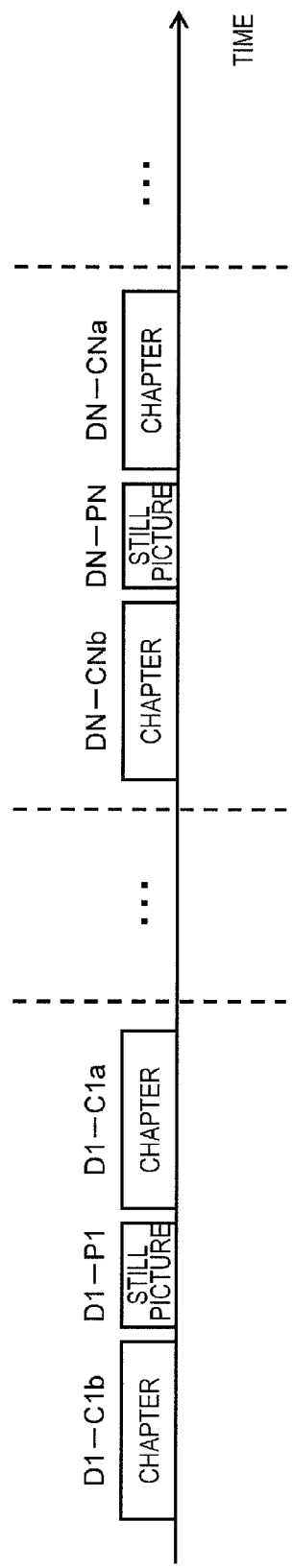
FIG. 4 generally illustrates how to record a digest movie.

FIG. 4 illustrates generally how to record a digest movie. And FIG. 4 illustrates conceptually a series of still pictures and chapters, which have been recorded in response to an instruction to shoot a still picture as a trigger and which are arranged time sequentially on the time axis. As shown in FIG. 4, there are two chapters just before and right after each still picture. In this example, an $N^{th}$ (where N is a natural number) digest movie will be identified herein by DN, the chapters just before and right after the $N^{th}$ still picture has been shot will be identified herein by DN-CNb and DN-CNa, respectively, and the $N^{th}$ still picture will be identified herein by DN-PN. Thus, the first digest movie is identified herein by D1, for example. In that case, the chapters just before and right after the first still picture has been shot are identified herein by D1-C1$b$ and D1-C1$a$, respectively, and the still picture shot at this time is identified herein by D1-P1.

As can be seen, in the digest movie recording mode, this digital camera 100 writes a still picture and chapters just before and right after the still picture on the memory card 221 one after another.

[1-2-1. Configuration of Digest Movie Menu]

Figure 5:
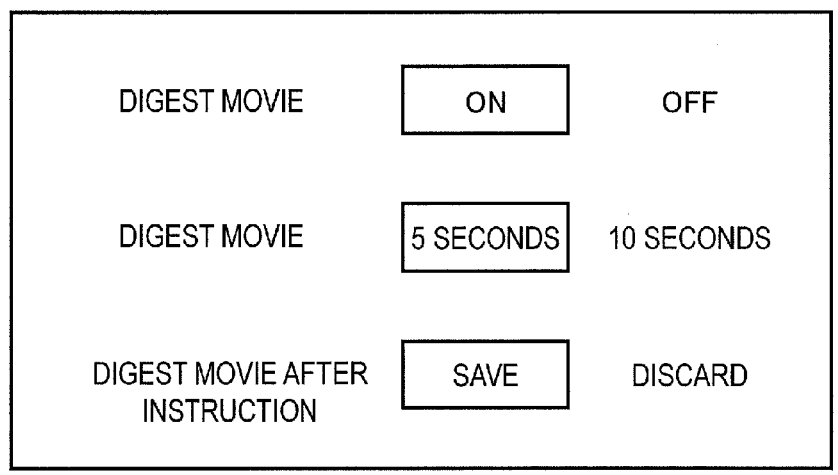
FIG. 5 illustrates generally how the digest movie setting menu looks.

FIG. 5 illustrates generally how the digest movie menu looks. In the digital camera 100 of this embodiment, when the user operates the operating section 223, a digest movie menu such as the one shown in FIG. 5 may be displayed on the LCD monitor 204.

As shown in FIG. 5, the digest movie menu includes three items that allow the user to decide whether or not he or she'd like to record the digest movie (ON/OFF), how long the chapters to generate should be (e.g., 5 seconds or 10 seconds), and whether or not the movie right after an instruction to record a still picture has been accepted should be generated as a chapter (save or discard). Optionally, the digest movie menu may further include another item that allows the user to decide whether or not the movie just before an instruction to record a still picture has been accepted should be generated as a chapter (save or discard). By operating the operating section 223, the user can choose any of these options of each item.

In the example to be described below, the user's preference as to whether or not to record the digest movie is supposed to be "ON", his or her preference as to how long the chapters to generate should be is supposed to be "5 seconds", and his or her preference as to whether or not the movie right after the instruction to record a still picture has been accepted should be generated as a chapter is supposed to be "save". Also, the instruction to shoot a still picture triggers an instruction to generate a chapter.

[1-2-2. Format of Digest Movie Management Information]

Figure 6:
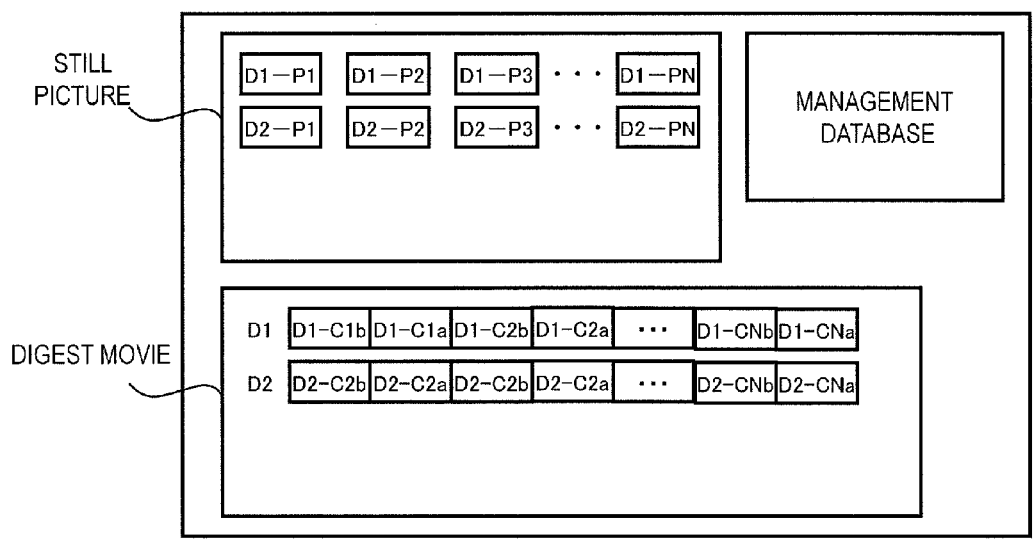
FIG. 6 illustrates the format of data stored in a memory card.

Next, the format of data to be written on the memory card 221 in the digest movie recording mode will be described with reference to FIG. 6, which illustrates conceptually the format of data to be written on the memory card 221.

A still picture, a digest movie and a management database are written on the memory card 221. In the management database, information about shooting the still picture and the chapters (which will be referred to herein as "shooting information") is managed. By reference to the management database, the controller 210 can check out the shooting information of the still picture and chapters that are stored on the memory card 221. Also managed in the management database is information about the relation between the still picture and the chapters that have been generated just before and right after the still picture (which will be referred to herein as "relation information"). By reference to the management database, the controller 210 can see what still picture has been written on the memory card 221 and what chapters have been written there in association with the still picture.

Next, the management information (including shooting information and relation information) to be managed in the management database will be described with reference to FIG. 7, which schematically illustrates a list of information to be managed in the management database.

As shown in FIG. 7, the management database includes content IDs, content types, digest movie IDs, real file names, chapter information (including the start time, end time and title of the chapter), relation information (including the ID of associated content and information about chapters before and after the still picture), and shooting information (including the date and time of shooting, scene mode information, geographic location information (GPS information), aspect ratio information, flash information, and camera shake information). The management database may also include place name information and angle of view information in addition to the pieces of information shown in FIG. 7. Even though these various kinds of information are supposed to be managed in this embodiment by using such a management database, these pieces of information may also be managed in the header section of each content data (including Exif and user data area).

The content ID is a unique identifier to be given to each content (which may be a still picture or a movie (chapter)). The content type is a piece of information indicating whether each content is a still picture (picture) or a movie (video). The digest movie ID is the ID of the digest movie in which each chapter is saved. The real file name is the name of the real file that includes each content. The chapter information includes the title of each chapter and the start time and end time in the digest movie. The relation information is information about the correlation between a still picture and chapters that have been generated with the still picture. The relation information includes the associated content ID and information about the chapters before and after the still picture. The associated content ID is the content ID of the associated movie (chapter) in the case of a still picture or the content ID of the associated still picture in the case of a movie (chapter). The information about the chapters before and after the still picture is a piece of information indicating whether the chapter is just before or right after the timing of shutter release. Optionally, the shooting information may further include other pieces of information about the standard of the movie.

[1-2-3. Digest Movie Recording Operation]

Hereinafter, it will be described how to record a digest movie.

Figure 8:
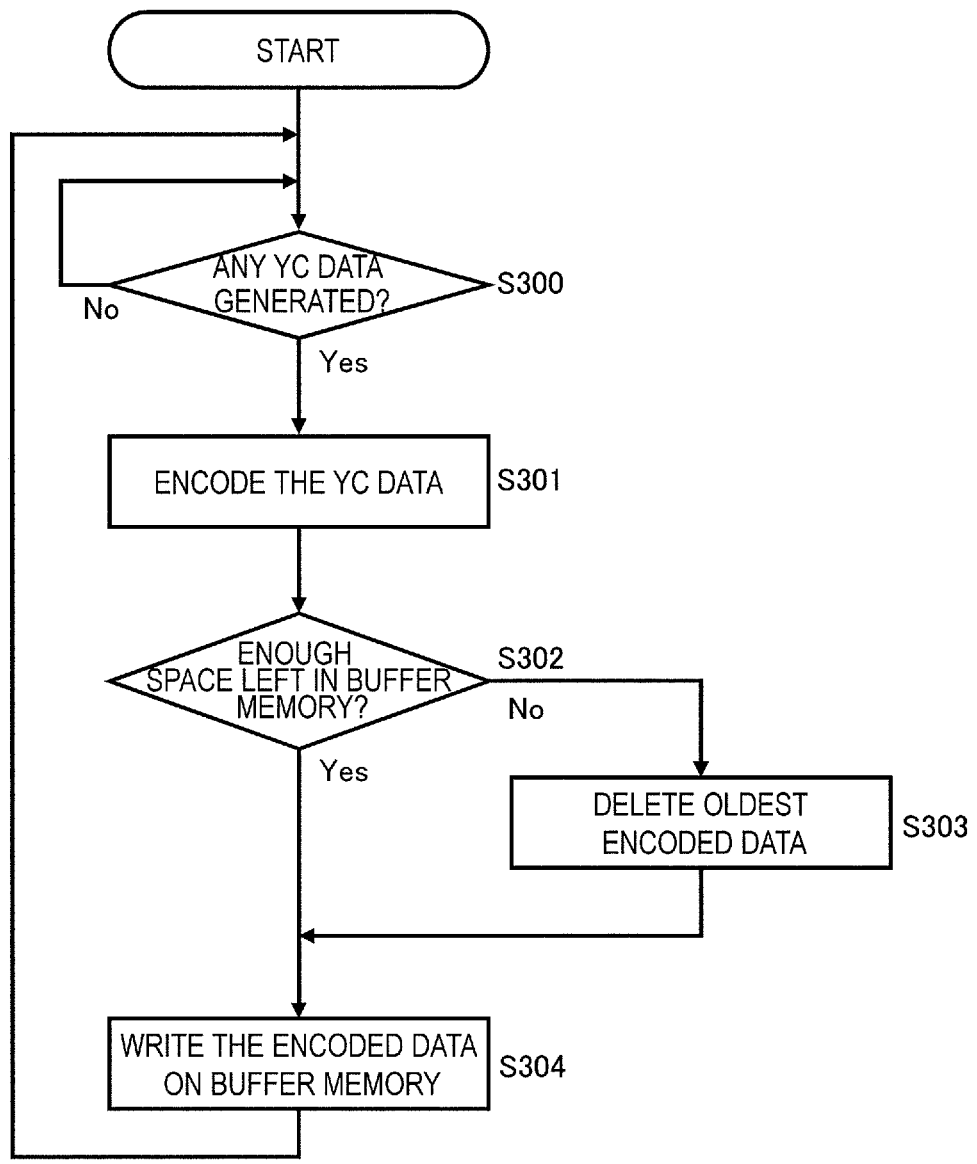
FIG. 8 is a flowchart showing the procedure of movie buffering processing.

First of all, it will be described with reference to FIG. 8 how this digital camera 100 performs movie buffering. FIG.

8 is a flowchart showing the procedure of that movie buffering. In generating a chapter, the movie generating section 262 in the image processor 203 performs movie buffering following the flow shown in FIG. 8.

If the mode of operation of this digital camera 100 is set to be the shooting mode, the CCD image sensor 201 gets the subject image that has been produced through the optical system 200 and sequentially generates image capturing data. As described above, the image capturing data that has been generated by the CCD image sensor 201 is subjected to the processing at the AFE 202 and then input to the image processor 203, which subjects the given image capturing data to YC conversion processing, thereby generating YC data. In general, the image capturing data generated by the CCD image sensor 201 is RGB data. That is why YC conversion processing is carried out so that the RGB data is converted into data representing a luminance component Y and data representing a color difference component C.

The controller 210 sees if the image processor 203 has generated YC data yet (in Step S300). If no YC data has been generated yet (i.e., if the answer to the query of the processing step S300 is NO), the controller 210 waits until YC data is generated. On the other hand, if YC data has already been generated, then the controller 210 instructs the image processor 203 to encode the YC data generated by a predetermined encoding method. In accordance with the instruction given by the controller 210, the image processor 203 encodes the YC data generated by the predetermined encoding method, thereby generating encoded data (in Step S301). In this manner, the encoded data of a movie (chapter) is generated.

Next, using the buffer memory 205 as a ring buffer, the controller 210 writes the encoded data on the buffer memory 205. That is to say, the controller 210 determines whether or not there is at least a predetermined space left in the buffer memory 205 (in Step S302). If the space left in the buffer memory 205 is less than the predetermined value (i.e., if the answer to the query of the processing step S302 is NO), then the controller 210 deletes the oldest encoded data that has been stored in the buffer memory 205 (in Step S303). In this processing step, if the encoded data has been generated in the MPEG file format, then the encoded data is deleted on a GOP (group of pictures) basis. Next, the controller 210 writes the encoded data that has been generated in Step S301 on the buffer memory 205 in which there is plenty of space left now as a result of the processing step S303. On the other hand, if the space left in the buffer memory 205 is equal to or greater than the predetermined value (i.e., if the answer to the query of the processing step S302 is YES), then the controller 210 writes the encoded data that has been generated in Step S301 as it is on the buffer memory 205 (in Step S304). After that, the controller 210 performs the same series of processing steps S300 through S304 all over again.

Figure 9:
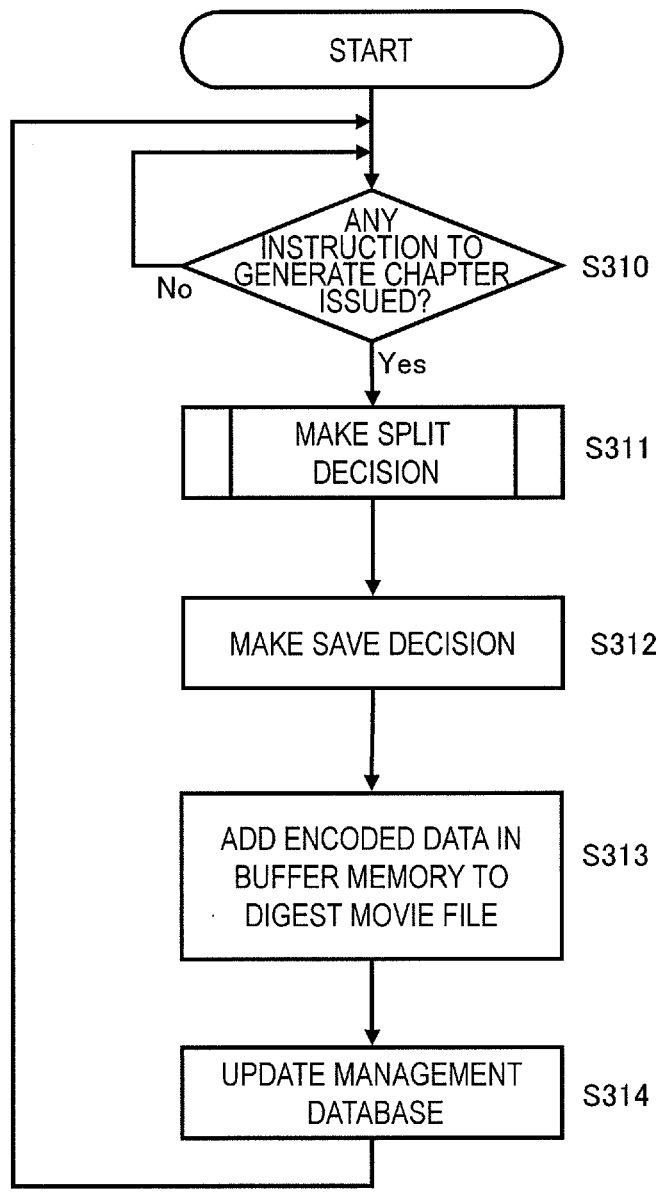
FIG. 9 is a flowchart showing the procedure in which a chapter of a digest movie is generated.

Next, it will be described with reference to FIG. 9 how to generate a movie (chapter) in response to an instruction to shoot a still picture as a trigger. FIG. 9 is a flowchart showing the procedure in which one chapter of a digest movie is generated.

First, the controller 210 sees if any instruction to generate a movie (chapter) in response to an instruction to shoot a still picture as a trigger has been issued (in Step S310). If any instruction to generate a movie (chapter) in response to an instruction to shoot a still picture as a trigger has been issued, the controller 210 decides whether the chapter to generate newly should be added to an existent digest movie file or a new digest movie file should be generated and the chapter should be saved there (in Step S311). Such a processing step will be referred to herein as a "split decision". The controller 210 makes such a split decision according to the setting information, the date and time of generation of the chapter, the shooting location, the subject shot and various other kinds of information. The split decision to be made in this processing step S311 will be described in detail later.

Next, the controller 210 performs save decision processing (in Step S312), which is a process for determining whether or not the encoded data stored in the buffer memory 205 should be saved as a chapter. If the encoded data stored in the buffer memory 205 is less than a predetermined size, the controller 210 decides that the encoded data stored in the buffer memory 205 not be saved as a chapter. On the other hand, if the encoded data stored in the buffer memory 205 is equal to or greater than the predetermined size, the controller 210 decides that the encoded data stored in the buffer memory 205 be saved as a chapter. Optionally, the save decision processing step S312 may be performed before the split decision processing step S311. In that case, if the decision has been made that the encoded data should not be save as a chapter, then the controller 210 may wait until an instruction to generate a chapter is issued next time without making the split decision. Also, the save decision processing step S312 is not an indispensable processing step but may be omitted.

Next, the controller 210 retrieves the encoded data that is stored in the buffer memory 205 and writes it on the digest movie file (in Step S313). In this case, if the decision has been made in Step S311 that the encoded data should be added to an existent digest movie file, the controller 210 adds the chapter to the existent digest movie file that has already been written on the memory card 221. On the other hand, if the decision has been made in Step S311 that a new digest movie file should be generated, then the controller 210 generates a new digest movie file and saves the chapter on that file.

Next, the controller 210 adds information about the newly generated chapter to the management database and updates the management database (in Step S314). The management information to be added to the management database includes content ID, content type, digest movie ID, real file name, chapter information, relation information, shooting information and so on as shown in FIG. 7. It should be noted that the information shown in FIG. 7 is just an example and that the management information may not include part of the information shown in FIG. 7 or may include other pieces of information as well.

[1-2-4. Condition for Splitting Digest Movie File During Recording]

Hereinafter, the split decision processing step S311 will be described in detail. The digital camera 100 of this embodiment can make a digest movie file spit decision under various conditions. For example, the digital camera 100 can make a split decision according to the mode selected, based on a result of a scene decision, by reference to geographic information, according to the date and time of shooting, or in accordance with the user's instruction.

As for which of these various types of split decisions to make, the controller 210 may determine it automatically or the user may specify in advance exactly how the split decision should be made. For example, every time a chapter is newly generated, the controller 210 may decide to which digest movie file the chapter should be added. Or if the user has specified a split decision condition, he or she may decide, on a one-by-one basis, whether each of the following various conditions should be applied or not.

[1-2-4-1. How to Split File According to Mode Selected]

First, it will be described as an example how a file may be split according to the mode selected. The digital camera 100 of this embodiment can split a given file according to the mode selected either in a single continuous period or in multiple discrete periods. In the following example, "travel mode" will be described as a mode of operation in which the file is supposed to be split in a single continuous period, and "baby mode" will be described as a mode of operation in which the file is supposed to be split in multiple discrete periods. Hereinafter, it will be described in this order exactly how to split a file in these modes of operation.

[1-2-4-1-1. How to Split File in Single Continuous Period]

Figure 10:
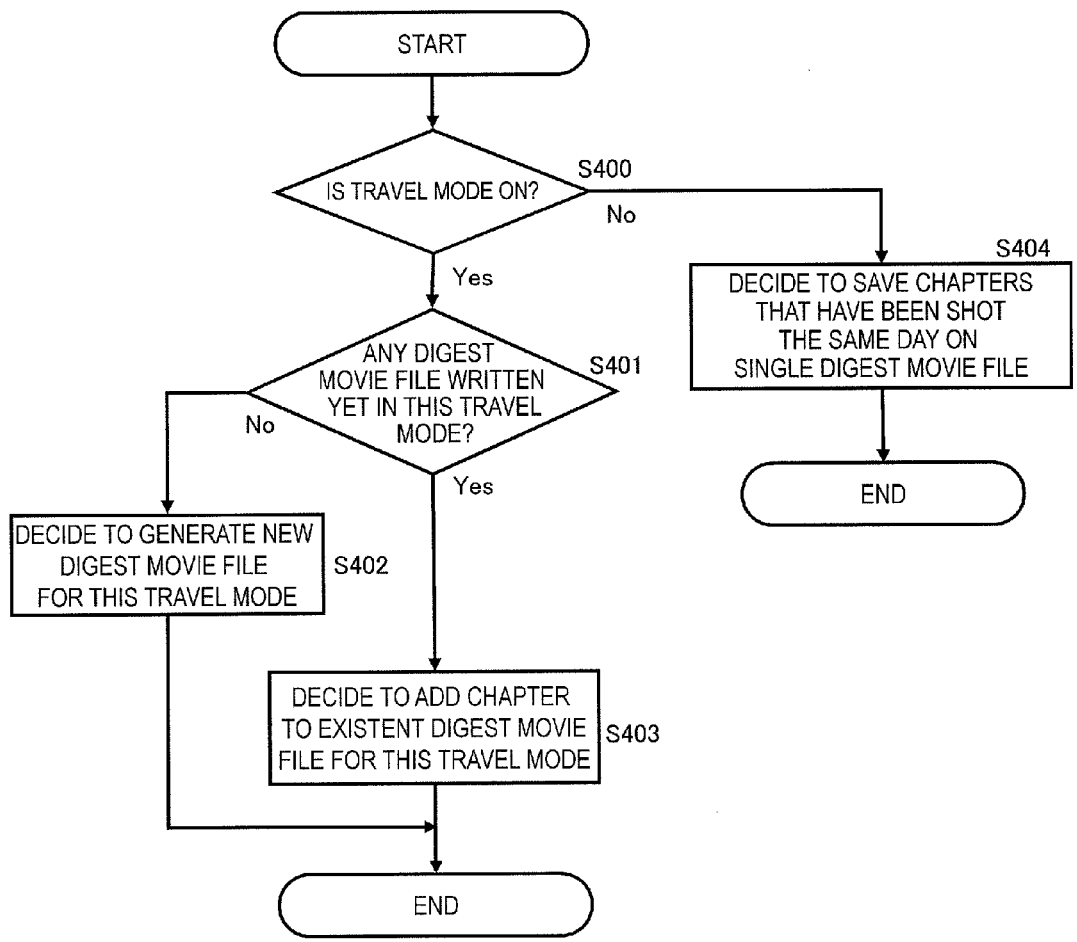
FIG. 10 is a flowchart showing the procedure of performing digest movie split decision processing in a situation where a travel mode has been selected as the mode of operation.

It will be described with reference to FIG. 10 how to split a file in a single continuous period. FIG. 10 is a flowchart showing the procedure of performing digest movie split decision processing in a situation where the travel mode has been selected as the mode of operation.

First of all, the controller 210 determines whether or not the mode of operation of this digital camera 100 is set to be the travel mode (in Step S400). The travel mode is a mode in which a flag indicating that the user is now traveling is added to an image shot. As shown in FIG. 7, the mode of managed as a piece of shooting information. Before setting the mode of operation to be the travel mode, the user enters the dates and times of going on, and coming back from, a travel into this digital camera 100 in advance. The controller 210 compares these dates and times to the current date and time by reference to a system clock (not shown) and automatically changes the modes of operation of this digital camera 100 into the travel mode when finding that the current date and time falls in the period between the dates and times of going on, and coming back from, a trip that the user have entered in advance.

If the mode of operation of the digital camera 100 is not set to be the travel mode (i.e., if the answer to the query of the processing step S400 is NO), the controller 210 decides to save a chapter newly generated, along with other chapters that have been generated the same day, on the same digest movie file collectively (in Step S404). That is to say, the controller 210 just adds the chapter newly generated to the digest movie file that has already been generated the same day. If no digest movie file has been generated yet the same day, however, the controller 210 decides to generate a new digest movie file separately from a digest movie file that was generated previously and save the chapter newly generated on the former file.

On the other hand, if the mode of operation of this digital camera 100 is set to be the travel mode (i.e., if the answer to the query of the processing step S400 is YES), then the controller 210 determines whether or not any digest movie has been written yet in this travel mode on the memory card 221 (in Step S401). It should be noted that "this travel mode" refers herein to the travel mode falling within the current period specified. In other words, if two travel modes are selected in two different specified periods, then the decision will be made that those chapters should be added to two different digest movie files.

If no digest movies have been written yet in this travel mode on the memory card 221 (i.e., if the answer to the query of the processing step S401 is NO), then the controller 210 decides to generate a new digest movie file for this travel mode in the memory card 221 and save the chapter newly generated on that new digest movie file (in Step S402).

On the other hand, if any digest movie has already been written in this travel mode on the memory card 221 (i.e., if the answer to the query of the processing step S401 is YES), then the controller 210 decides to add the chapter newly generated to the existent digest movie file in this travel mode (in Step S403).

As can be seen, the digital camera 100 writes multiple chapters that have been generated during a single continuous period in the current travel mode as a single digest movie file on the memory card 221. As a result, the user can enjoy, as a single movie file, a digest of multiple chapters that have been shot on multiple different dates during the same travel period.

In the example described above, if the mode of operation is set to be the travel mode, chapters generated are supposed to be added to a digest movie file that is associated with the travel mode in the same period. Alternatively, when the mode of operation is set to be the travel mode, those chapters newly generated may also be added to a digest movie file that was already generated before the travel mode is selected but that still has the same date of shooting. In that case, as long as the travel mode is selected, chapters will be added to same digest movie file even if their dates may be different. As a result, the user can enjoy a digest movie including a scene just before he or she went on a travel.

Also, in the example described above, the user is supposed to specify a single continuous period by entering, in advance, the dates and times of going on, and coming back from, a travel into the digital camera 100. However, this is just an example. Alternatively, the mode of operation of the digital camera 100 may be the travel mode between a point in time when the user turns the travel mode ON and a point in time when he or she turns the travel mode OFF on the menu. In that case, even during the same day (not over multiple different days), a plurality of digest movies can be generated by allowing the user to turn ON and OFF the travel mode at any time he or she likes. Also, if the user has decided him- or herself to generate a digest movie for a special event such as a field day or a wedding ceremony, then he or she just needs to turn the travel mode ON and OFF at the start and end times of his or her targeted event to make a digest movie of that event during the specified period.

In the example that has been described with reference to FIG. 5, the user is supposed to decide by him- or herself whether he or she'd like to generate a digest movie. However, when the travel mode is selected, the controller 210 may automatically turn ON the mode of generating a digest movie.

[1-2-4-1-2. How to Split File in Multiple Discrete Periods]

Figure 11:
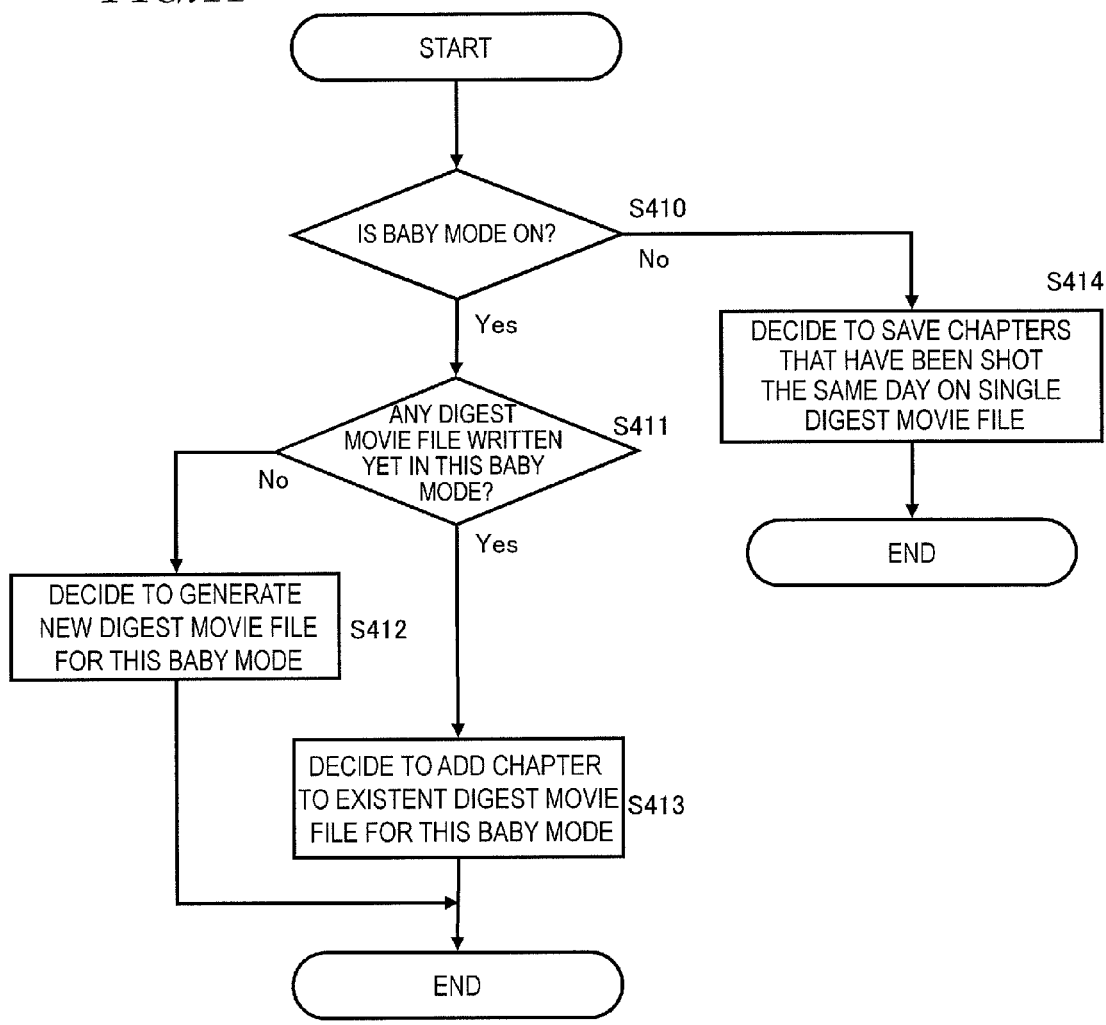
FIG. 11 is a flowchart showing the procedure of performing digest movie split decision processing in a situation where a baby mode has been selected as the mode of operation.

Hereinafter, it will be described with reference to FIG. 11 how a file may be split in multiple discrete periods. FIG. 11 is a flowchart showing the procedure of performing digest movie split decision processing in a situation where the mode of operation is set to be the baby mode.

First of all, the controller 210 determines whether or not the mode of operation of this digital camera 100 is set to be the baby mode (in Step S410). The baby mode is a mode in which a flag indicating that the subject is a baby is added to an image shot. If the user has decided him- or herself to shoot a baby, then he or she just needs to turn ON and OFF the baby mode at the start and end times of his or her targeted baby shooting period to set the mode of operation of this digital camera 100 to be the baby mode.

If the mode of operation of the digital camera 100 is not set to be the baby mode (i.e., if the answer to the query of the processing step S410 is NO), then the controller 210 decides to save a chapter newly generated, along with other chapters that have been generated the same day, on the same digest movie file collectively (in Step S414). As this processing step S414 is almost the same as the processing step S404 shown in FIG. 10, its description will be omitted herein.

On the other hand, if the mode of operation of this digital camera 100 is set to be the baby mode (i.e., if the answer to the query of the processing step S410 is YES), then the controller 210 determines whether or not any digest movie has been written yet in the baby mode on the memory card 221 (in Step S411).

If no digest movies have been written yet in the baby mode on the memory card 221 (i.e., if the answer to the query of the processing step S411 is NO), then the controller 210 decides to generate a new digest movie file for the baby mode in the memory card 221 and save the chapter newly generated on that new digest movie file (in Step S412).

On the other hand, if any digest movie has already been written in the baby mode on the memory card 221 (i.e., if the answer to the query of the processing step S411 is YES), then the controller 210 decides to add the chapter newly generated to the existent digest movie file in the baby mode (in Step S413).

As can be seen, this digital camera 100 writes chapters that have been generated while its mode of operation is set to be the baby mode as a single digest movie file on the memory card 221. In this case, as the user turns ON and OFF the baby mode every time he or she decides to shoot the baby, there will be multiple discrete periods in which the mode of operation of the digital camera 100 is set to be the baby mode. That is why in the baby mode, the controller 210 generates a single digest movie file by combining the chapters that have been shot in those discrete periods when the mode of operation of the digital camera 100 is set to be the baby mode. As a result, the user can enjoy, as a single movie file, a digest movie representing the same baby shot. Particularly, as even multiple chapters that have been generated in multiple discrete periods can also be combined into a single movie file, the user can enjoy this digest movie as that baby's growth record.

In the example that has been described with reference to FIG. 5, the user is supposed to decide by him- or herself whether he or she'd like to generate a digest movie. However, when the baby mode is selected, the controller 210 may automatically turn ON the mode of generating a digest movie.

In the example described above, chapters are supposed to be recorded in multiple discrete periods in the baby mode. However, this is only an example. That is to say, this method is applicable to any other situation where chapters generated in multiple discrete periods need to be recorded, e.g., when the user wants to keep a record of his or her pet or insect growing.

In the example described above, a digest movie of a single baby is supposed to be generated. However, this is just an example. If there are multiple babies to shoot for the user, then the controller 210 may have multiple baby modes that he or she can use separately from each other. Then, multiple different digest movie files can be generated on a baby by baby basis.

[1-2-4-2. How to Split File Based on Result of Scene Decision]

Figure 12:
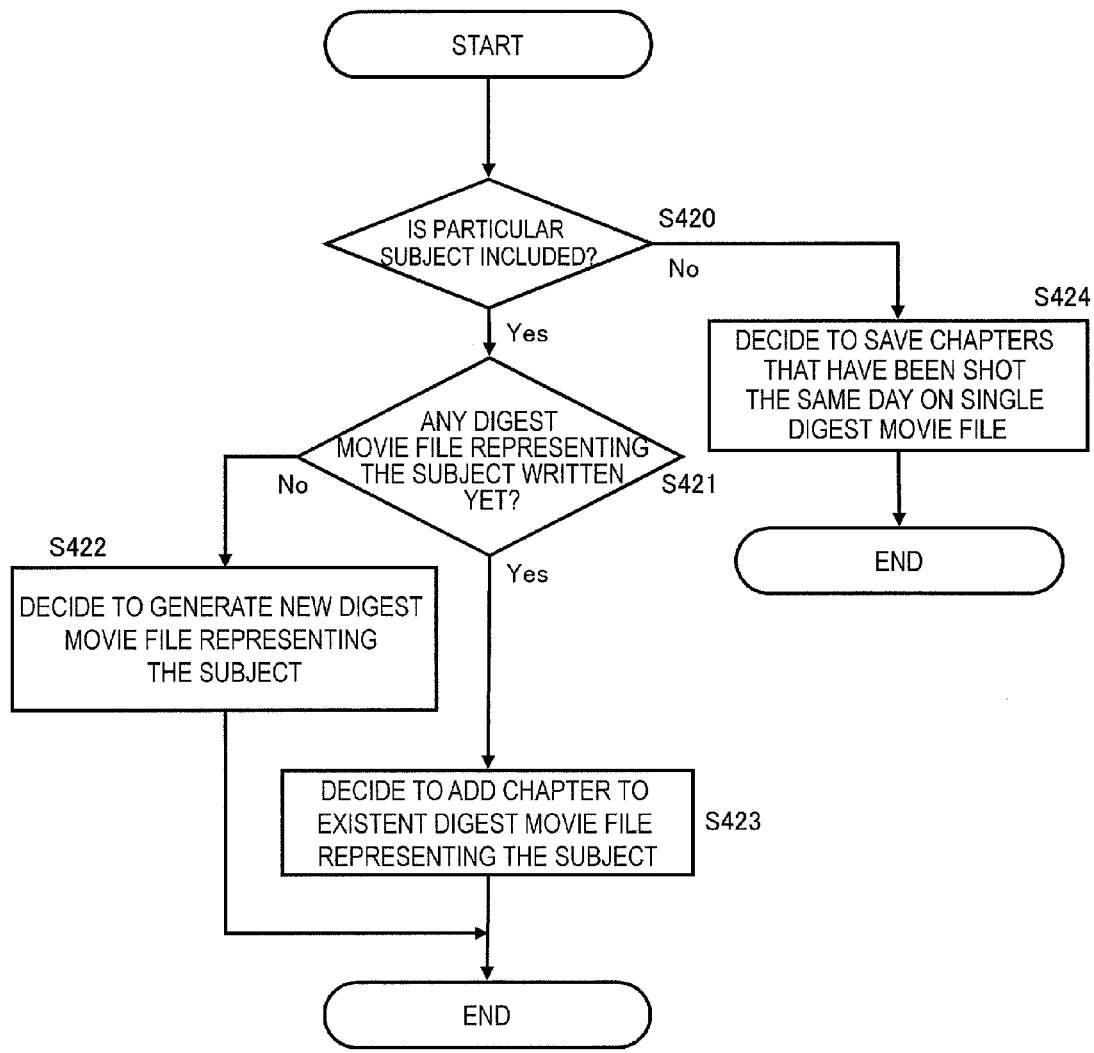
FIG. 12 is a flowchart showing the procedure of performing digest movie split decision processing on a particular subject.

Next, it will be described with reference to FIG. 12 how a file may be split based on a result of a scene decision. FIG. 12 is a flowchart showing the procedure of making a digest movie split decision based on a result of a scene decision.

First of all, the controller 210 makes the image processor 203 determine whether or not a still picture being shot includes a particular subject (in Step S420). The "particular subject" may be the face of a person that the user has added in advance to a face recognition list. The user needs to choose in advance his or her targeted person, for whom a digest movie is going to be generated, from the people on the list. The controller 210 generates a digest movie by combining together multiple chapters representing the person designated by the user (i.e., the particular subject).

If the still picture being shot does not include the person designated by the user (i.e., if the answer to the query of the processing step S420 is NO), then the controller 210 decides to save a chapter newly generated, along with other chapters that have been generated the same day (i.e., chapters associated with a still picture not including the person designated by the user), on the same digest movie file collectively (in Step S424). As this processing step S424 is almost the same as the processing step S404 shown in FIG. 10, its description will be omitted herein.

On the other hand, if the still picture being shot does include the person designated by the user (i.e., if the answer to the query of the processing step S420 is YES), then the controller 210 determines whether or not any digest movie representing the person designated by the user has been written yet on the memory card 221 (in Step S421).

If no digest movie representing the person designated by the user has been written yet on the memory card 221 (i.e., if the answer to the query of the processing step S421 is NO), then the controller 210 decides to generate a new digest movie file representing the person designated by the user in the memory card 221 and save the chapter newly generated (i.e., a chapter associated with the still picture representing the person designated by the user) on that new digest movie file (in Step S422).

On the other hand, if any digest movie representing the person designated by the user has already been written on the memory card 221 (i.e., if the answer to the query of the processing step S421 is YES), then the controller 210 decides to add the chapter newly generated (i.e., a chapter associated with the still picture representing the person designated by the user) to the existent digest movie file representing the person designated by the user (in Step S423).

As can be seen, this digital camera 100 writes chapters associated with a still picture representing the person designated by the user as a single digest movie file on the memory card 221. As a result, the user can enjoy, as a single movie file, a digest movie of multiple chapters including shots of his or her designated person. Particularly, as even multiple chapters that have been generated in multiple discrete periods can also be combined into a single movie file, the user can enjoy this digest movie as that person's record.

In the example described above, the decision is supposed to be made whether or not a still picture represents a particular subject. However, this is only an example. Alternatively, the decision may also be made whether or not a chapter represents a particular subject. Since a still picture is what has been shot intentionally by the user, it is the controller 210 that determines whether or not the still picture represents the particular subject according to this embodiment.

[1-2-4-3. How to Split File by Reference to Geographic Information]

Figure 13:
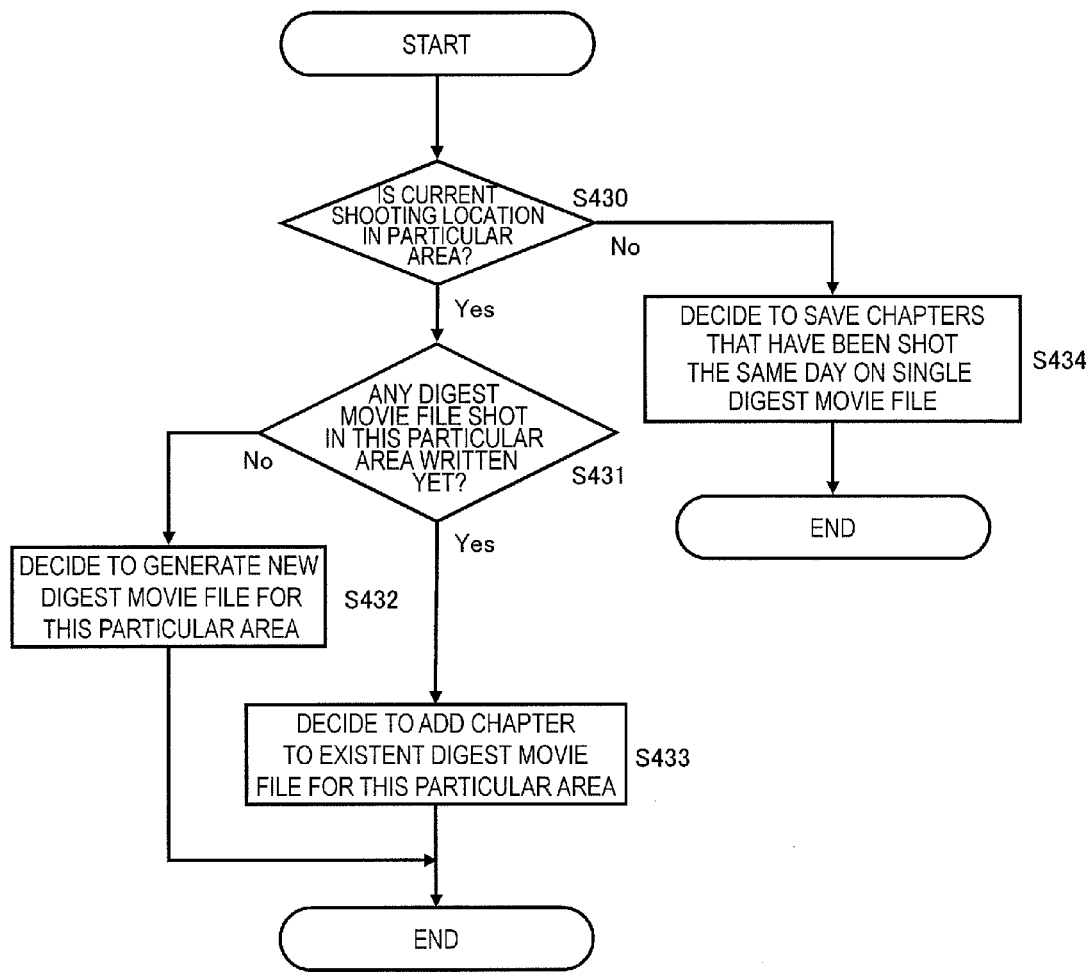
FIG. 13 is a flowchart showing the procedure of performing digest movie split decision processing when a shooting session is carried out in a particular district.

Next, it will be described with reference to FIG. 13 how a file may be split by reference to geographic information. FIG. 13 is a flowchart showing the procedure of making a digest movie split decision by reference to geographic information.

First of all, the controller 210 gets geographic information of the current location (including the latitude and longitude) from the GPS unit 270. By reference to that information, the controller 210 determines whether or not the current location is within a particular area specified in advance (in Step S430). In this case, the particular area may be either any arbitrary administrative district such as the country, prefecture, city, town or village or any other arbitrarily defined, non-administrative area. The user needs to choose in advance a targeted area in which a digest movie is going to be generated from multiple candidate areas provided. In response, the controller 210 generates a digest movie of chapters that have been shot in the area (particular area) specified by the user.

If the current shooting location is not within the area specified by the user (i.e., if the answer to the query of the processing step S430 is NO), then the controller 210 decides to save a chapter newly generated, along with other chapters that have been generated the same day, on the same digest movie file collectively (in Step S434). As this processing step S434 is almost the same as the processing step S404 shown in FIG. 10, its description will be omitted herein.

On the other hand, if the current shooting location is within the area specified by the user (i.e., if the answer to the query of the processing step S430 is YES), then the controller 210 determines whether or not any digest movie that has been shot within the particular area specified by him or her has been written yet on the memory card 221 (in Step S431).

If no digest movie that has been shot within the particular area specified by the user has been written yet on the memory card 221 (i.e., if the answer to the query of the processing step S431 is NO), then the controller 210 decides to generate a new digest movie file that has been shot within the particular area specified by the user in the memory card 221 and save the chapter newly generated on that new digest movie file (in Step S432).

On the other hand, if any digest movie that has been shot within the particular area specified by the user has already been written on the memory card 221 (i.e., if the answer to the query of the processing step S431 is YES), then the controller 210 decides to add the chapter newly generated to the existent digest movie file that has been shot within the particular area specified by the user (in Step S433).

As can be seen, this digital camera 100 writes chapters that have been shot within the particular area specified by the user as a single digest movie file on the memory card 221. As a result, the user can enjoy, as a single movie file, a digest movie of multiple chapters that have been shot in his or her specified area. Particularly, as even multiple chapters that have been generated in multiple discrete periods can also be combined into a single movie file, the user can enjoy this digest movie as that particular area's record.

Figure 14:
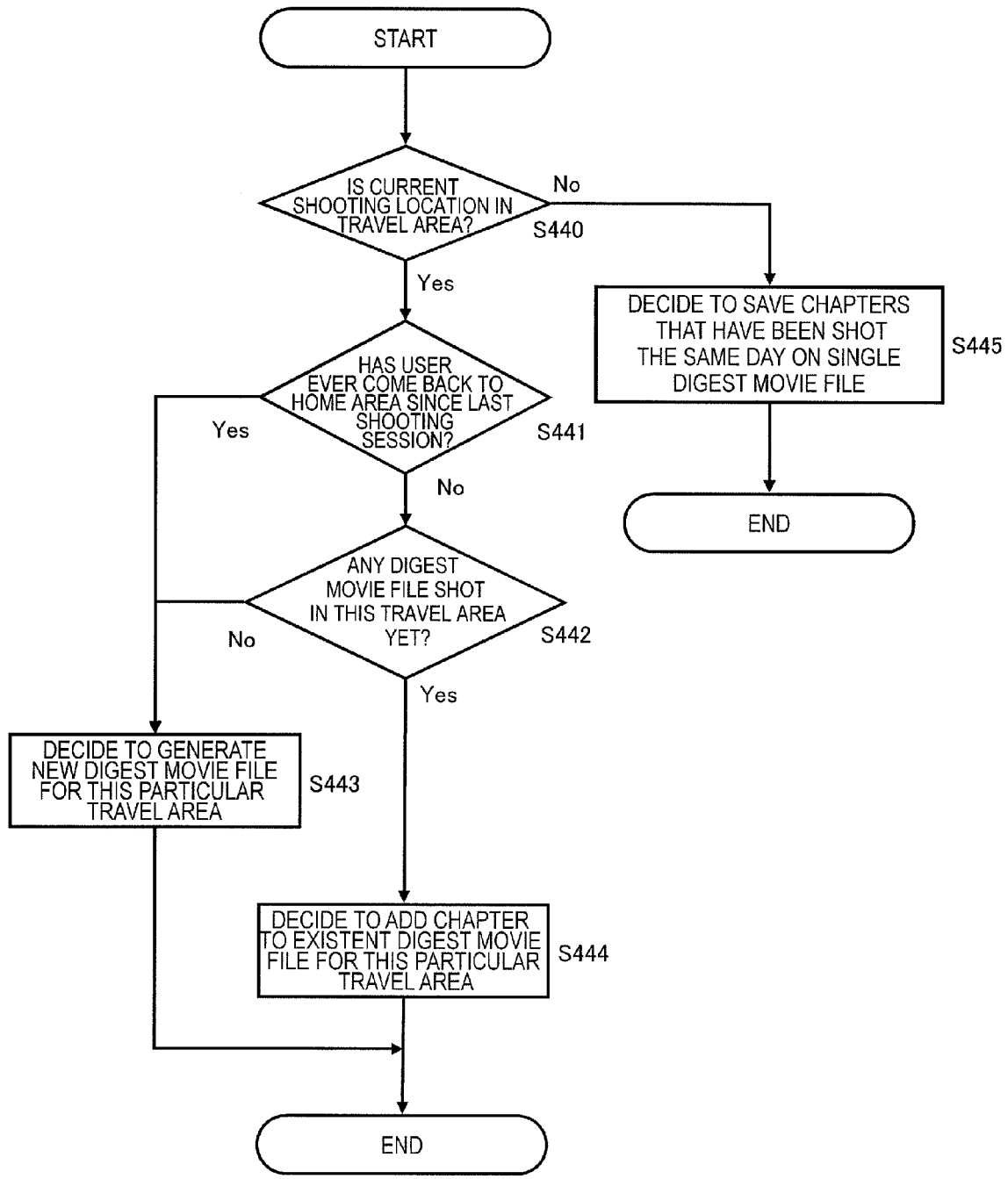
FIG. 14 is a flowchart showing the procedure of performing digest movie split decision processing when a shooting session is carried out outside of a user's home area (i.e., in a travel area).

Next, it will be described how to make a split decision on a digest movie that the user has shot outside of his or her home area (i.e., in a travel area). FIG. 14 is a flowchart showing the procedure of making a split decision on such a digest movie. In this description, the "home area" refers herein to an area which is located at or less than a first distance from the geographic coordinates of the user's home that have been entered by him- or herself. The first distance is set to be any arbitrary value but may fall within the range of a few ten meters to several kilometers. On the other hand, the "travel area" refers herein to an area which is located more than a second distance away from the geographic coordinates of the user's home that have been entered by him- or herself. Optionally, the first and second distances could be the same. In this embodiment, however, to allow the digital camera 100 to detect the current location with stability, the second distance is supposed to be longer than the first distance.

First of all, the controller 210 gets geographic information (including the latitude and longitude) of the current location from the GPS unit 270 and determines whether or not the current location is within the travel area (in Step S440).

If the current shooting location is not within the travel area (i.e., if the answer to the query of the processing step S440 is NO), then the controller 210 decides to save a chapter newly generated, along with other chapters that have been generated the same day, on the same digest movie file collectively (in Step S445). As this processing step S445 is almost the same as the processing step S404 shown in FIG. 10, its description will be omitted herein.

On the other hand, if the current shooting location is within the travel area (i.e., if the answer to the query of the processing step S440 is YES), then the controller 210 determines whether or not the user has ever come back to his or her home area since the last shooting session (in Step S441).

If the user has come back to his or her home area at least once since the last shooting session, (i.e., if the answer to the query of the processing step S441 is YES), then the controller 210 decides to generate a new digest movie file in the memory card 221 and save the chapter newly generated on that new digest movie file (in Step S443). In the following description, a period from a point in time when the user left his or her home area through a point in time when he or she comes back to his or her home area will be regarded herein as a single unit period and shooting sessions performed within that period will be regarded herein as a series of shooting sessions within the same travel area. If the user has come back to his or her home area once and then left that area again, then he or she is regarded herein as having entered a new travel area.

On the other hand, if the user has never come back to his or her home area since the last shooting session (i.e., if the answer to the query of the processing step S441 is NO), then the controller 210 determines whether or not an existent digest movie that was shot within the same travel area has been written on the memory card 221 (in Step S442).

If no existent digest movie that was shot within the same travel area has been written on the memory card 221 (i.e., if the answer to the query of the processing step S442 is NO), then the controller 210 decides to generate a new digest movie file in the memory card 221 and save the chapter newly generated on that new digest movie file (in Step S443).

On the other hand, if any existent digest movie including a chapter that was shot within the same travel area has been written on the memory card 221 (i.e., if the answer to the query of the processing step S442 is YES), then the controller 210 decides to add the chapter newly generated to the existent digest movie file that has been shot within the same travel area (in Step S444).

As can be seen, this digital camera 100 writes, as a single digest movie file, a plurality of chapters that have been shot within the same area on the memory card 221. As a result, the user can enjoy, as a single movie file, a digest movie of multiple chapters that have been shot while he or she was away from his or her home area to go on a travel, for example.

[1-2-4-4. How to Split File Based on Shooting Time]

Figure 15:
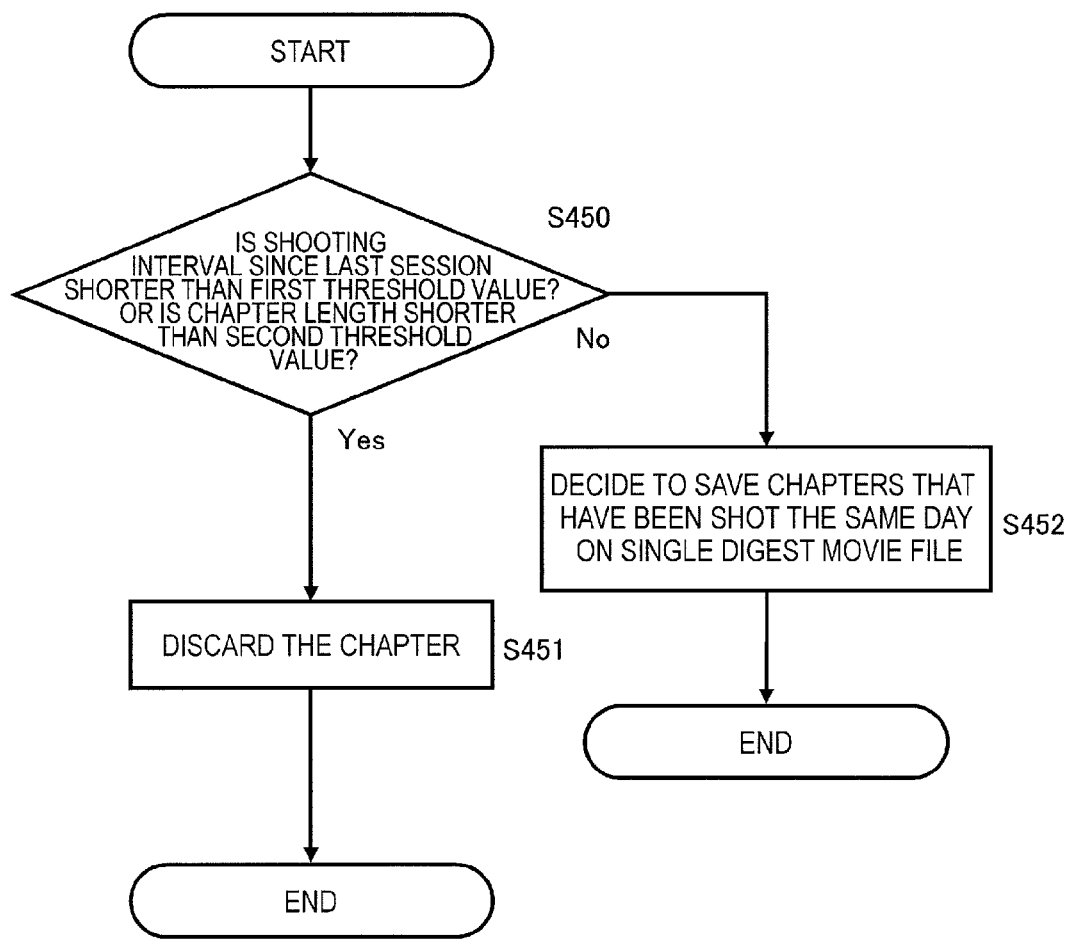
FIG. 15 is a flowchart showing the procedure of performing digest movie split decision processing based on a shooting interval or a chapter length.

Next, it will be described with reference to FIG. 15 how a file may be split based on a shooting time. FIG. 15 is a flowchart showing the procedure of making a digest movie split decision based on either a shooting interval or a chapter length.

The controller 210 determines whether or not the time interval between a point in time when a shooting session was carried out last time and a point in time when a shooting session is carried out this time is shorter than a first threshold value (in Step S450). Also, the controller 210 determines whether or not the length of a chapter to generate is shorter than a second threshold value (in Step S450). If the time interval between the last and current shooting sessions is equal to or longer than the first threshold value (i.e., if the answer to the query of the processing step S450 is NO), then the controller 210 decides to save a chapter newly generated, along with other chapters that have been generated the same day, on the same digest movie file collectively (in Step S452). In the same way, if the length of the chapter to generate is equal to or greater than the second threshold value (i.e., if the answer to the query of the processing step S450 is NO), then the controller 210 decides to save a chapter newly generated, along with other chapters that have been generated the same day, on the same digest movie file collectively (in Step S452). That is to say, if at least one of the answers to the queries of the processing step S450 asking if the time interval between the last and current shooting sessions is shorter than the first threshold value and if the length of the chapter to generate is shorter than the second threshold value is NO, then the process advances to Step S452. As this processing step S452 is almost the same as the processing step S404 shown in FIG. 10, its description will be omitted herein.

On the other hand, if both of the answers to the queries of the processing step S450 asking if the time interval between the last and current shooting sessions is shorter than the first threshold value and if the length of the chapter to generate is shorter than the second threshold value is YES, then the process advances to Step S451, in which the controller 210 discards the chapter that has just been shot this time.

If the shooting interval between the last and current shooting sessions is too short, similar movies are highly likely to be presented consecutively. In that case, it is possible to avoid generating a redundant digest movie by discarding a chapter.

Also, if the chapter is too short, then a sufficiently long scene (movie interval) cannot be ensured. That is why by discarding a chapter in such a situation, it is possible to avoid generating a digest movie that is not comfortable to view.

When continuous shooting sessions are carried out, the shooting interval between the last and current shooting sessions is short, so is the chapter length. For that reason, when continuous shooting sessions are carried out, the user may be prohibited from generating a digest movie.

[1-2-4-5. How to Split File in Accordance with User's Instruction]

Figure 16A:
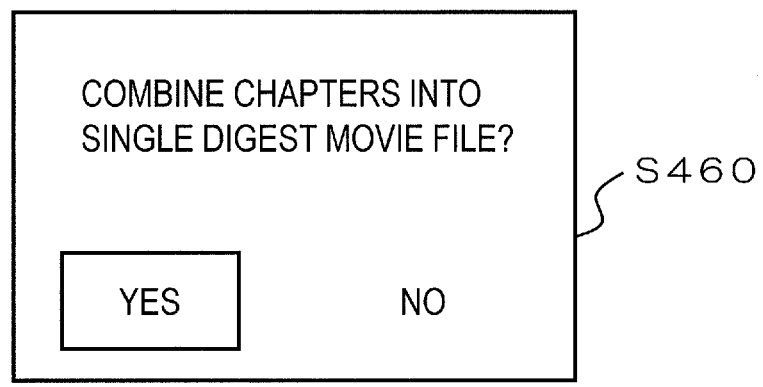
FIG. 16A schematically illustrates an exemplary dialog box which prompts the user to decide whether or not to get multiple chapters combined into a single digest movie file while a split decision is being made.
Figure 16B:
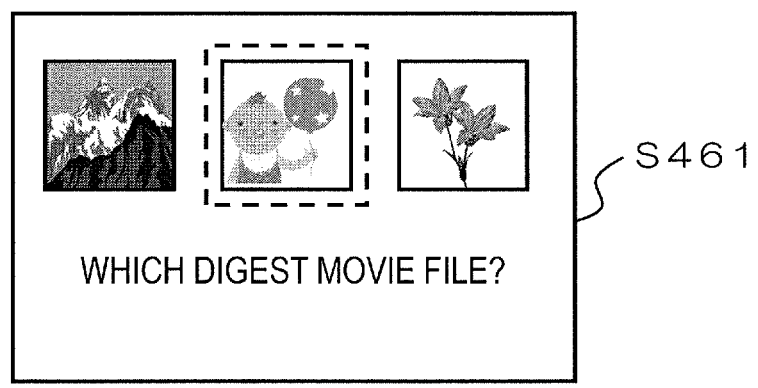
FIG. 16B schematically illustrates an exemplary dialog box which prompts a user to choose one of multiple digest movie files that the user wants to get multiple chapters combined into while a split decision is being made.
Figure 17:
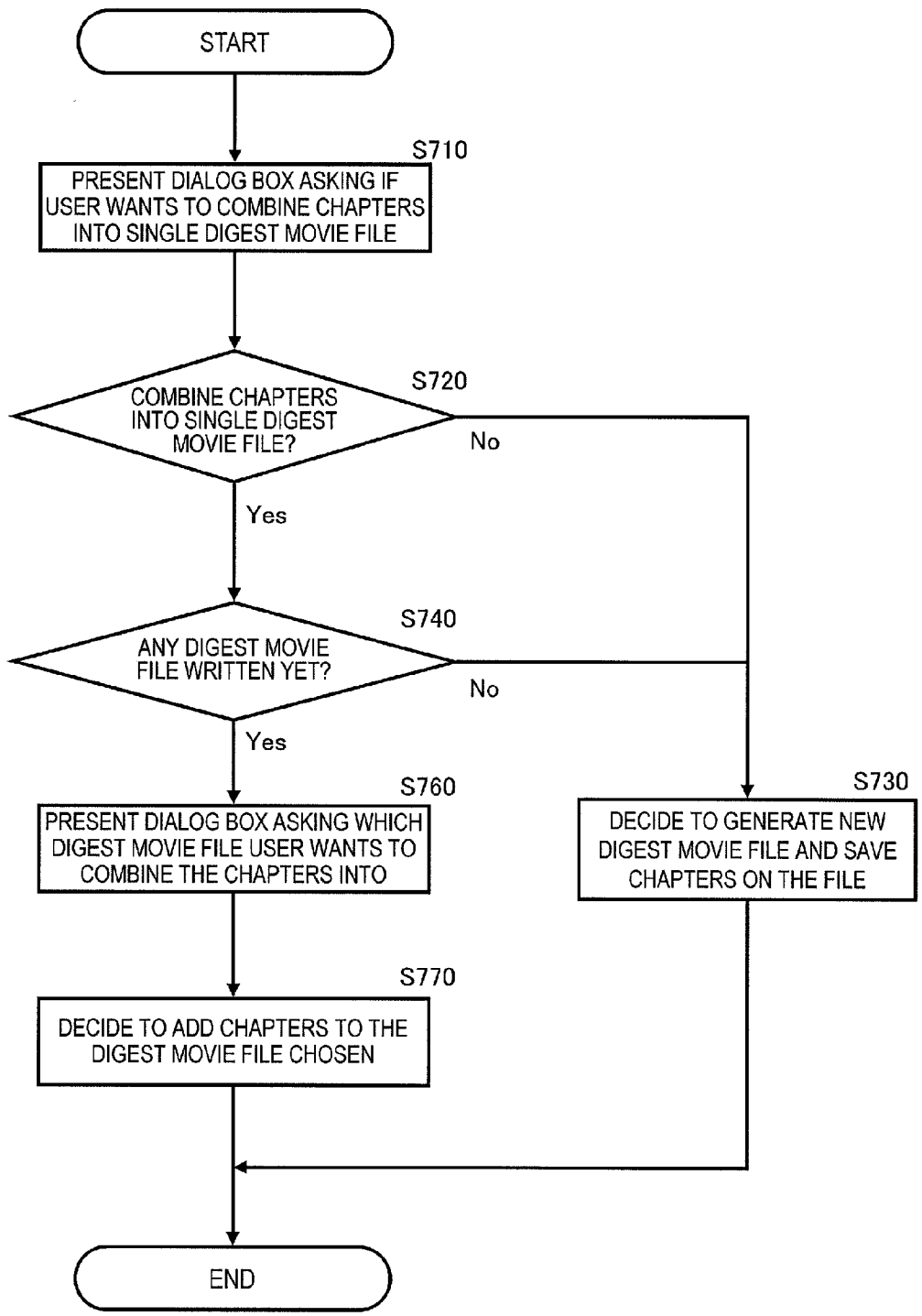
FIG. 17 is a flowchart showing the procedure of performing split decision processing in a situation where such a dialog box that prompts the user to make his or her choice is presented on the screen while a split decision is being made.

Next, it will be described with reference to FIGS. 16A, 16B and 17 how a file may be split in accordance with a user's instruction. FIGS. 16A and 16B schematically illustrate dialog boxes that prompt the user to choose one of the options presented on the screen when a split decision is being made. FIG. 17 is a flowchart showing the procedure of performing the split decision processing of this example.

As shown in FIG. 17, first of all, the controller 210 gets a dialog box, which prompts the user to decide whether or not to get newly generated chapters combined into a single digest movie, presented on an LCD monitor 204 (in Step S710).

FIG. 16A illustrates an exemplary dialog box to be presented on the LCD monitor 204 by the controller 210 in Step S710. In the example illustrated in FIG. 16A, a dialog box asking the user if he or she wants to get chapters to generate combined into an existent digest movie file is presented. By operating the operating section 223, the user can decide whether or not to get chapters to generate combined into an existent digest movie file.

If the user decides not to get the chapters combined into an existent digest movie file (i.e., if his or her answer is NO in FIG. 16A), the controller 210 decides to generate a new digest movie file and save the chapters on that file (in Step S730). On the other hand, if the user decides to get the chapters combined into an existent digest movie file (i.e., if his or her answer is YES in FIG. 16A), then the controller 210 determines whether or not there is any existent digest movie file (in Step S740). If no digest movie file is existent, the controller 210 decides to generate a new digest movie file and save the chapters on that file (in Step S730). On the other hand, if there is any existent digest movie file, then the controller 210 decides to add the chapters generated to the existent digest movie file. In that case, the controller 210 gets a dialog box asking the user which digest movie file he or she wants to get those chapters combined into presented on the LCD monitor 204 (in Step S760).

FIG. 16B illustrates an exemplary dialog box to be presented on the LCD monitor 204 by the controller 210 in Step S760. In FIG. 16B, presented is a dialog box asking the user which of multiple existent digest movie files he or she wants to get chapters to generate combined into. By operating the operating section 223, the user can decide which of those existent digest movie files he or she wants to get those chapters to generate combined into. In accordance with his or her instruction, the controller 210 decides to add the chapters to generate to the existent digest movie file that has been specified by him or her (in Step S770).

In this manner, at the timing when a chapter is generated, the controller 210 gets a dialog box, asking the user if he or she wants to get the chapters split (or combined), presented on the LCD monitor 204. As a result, a single digest movie file can be generated so as to respect the user's preference more fully.

[1-2-4-6. Other Manners of Splitting File]

The split decisions described above are only examples of the present disclosure and the given file may be split in various other manners. Following are just some of those various other embodiments of split decision.

(1) The digital camera 100 and a device with a schedule management capability such as a smart phone may be used in combination and in cooperation with each other. In that case, by getting schedule information from the smart phone, the digital camera 100 may be configured to perform similar functions to a situation where a particular period is set in the travel mode as described above.

(2) The digital camera 100 may perform, in accordance with the calendar of a specified country, similar functions to a situation where a particular period is set in the travel mode described above. For example, the digital camera 100 may be programmed to combine chapters that have been shot at the end of one year and at the beginning of the next year into a single digest movie file. Examples of other particular periods to be set in accordance with the calendar include so-called "Golden Week", which is a series of Japanese national vacations at the beginning of May of each year, and so-called "O-Bon", which is another series of Japanese national holidays in the middle of August of each year when most Japanese come home to visit their parents' or ancestors graves.

(3) If a series of chapters have been shot over multiple consecutive days, then the digital camera 100 may combine those chapters into a single digest movie file. For example, if chapters have been generated three consecutive days, then each and every chapter that has been shot during those three days may be combined into a single digest movie file. However, if a given period includes a day when no chapters were generated at all, then the chapters that have been generated from the next day and on may be combined into another digest movie file.

(4) The digital camera 100 may evaluate the audio of a chapter and may determine, based on a result of the evaluation, whether or not to add the chapter being generated to a single digest movie file. For example, either only scenes with high audio levels or only scenes with low audio levels may be combined together. Optionally, the decision may be made on only chapters, of which the audio includes noise that is equal to or lower than a predetermined reference level, whether those chapters should be added to a single digest movie file or not.

(5) If the date or time of its internal clock has been changed, the digital camera 100 may decide not to add a chapter newly generated to any existent digest movie file. That is to say, before a chapter generated after the clock setting has been changed is recorded, a new digest movie file may be generated. Then, it is possible to avoid adding by mistake an unwanted chapter to an existent digest movie file even though the date has been changed.

(6) If the size of an existent digest movie file exceeds a predetermined value, the digital camera 100 may decide not to add a newly generated chapter to that existent digest movie file. For example, if the file size of an existent digest movie file associated with a chapter newly generated is greater than 4 GB, then a new digest movie file may be generated. By setting an upper limit to the file size in this manner, it is possible to avoid generating a digest movie file of an excessively large size.

(7) If the total running time of an existent digest movie file exceeds a predetermined reference time, the digital camera 100 may decide not to add a newly generated chapter to that existent digest movie file. The predetermined reference time may be set to be 30 minutes, for example. In that case, if the total running time of an existent digest movie file related to a chapter newly generated is longer than 30 minutes, then another digest movie file may be newly generated. By setting an upper limit to the running time in this manner, it is possible to avoid generating a digest movie file with an excessively long running time.

(8) If the memory card 221 has been once removed from the card slot 220 and then attached again, then the digital camera 100 may decide not to add a newly generated chapter to an existent digest movie file. The reason is that if the memory card 221 has been removed once, the shooter is likely to have finished a series of shooting sessions in many cases. That is to say, if the memory card 221 has been once removed and then attached again, then it is often the case that the shooter is going to start a new series of shooting sessions. That is why if the memory card 221 has been once removed and then attached again, a digest movie can be generated so as to respect the shooter's preference more fully by saving a chapter generated on a newly generated digest movie file.

1-3. Effects

As described above, an image capture device (digest camera) 100 according to this embodiment includes an image processor 203 which is configured to generate movie data (a chapter) for a preset period of time in response to a shooting instruction that has been given by a user, and a controller 210 which is configured to write the chapter generated on a storage medium such as a memory card 221. If any movie file (digest movie file) has already been written on the storage medium and if the chapter is related to the existent digest movie file, or if the user decides to add it, the controller 210 just adds the chapter to the existent digest movie file. According to such an embodiment, a plurality of chapters which are related to each other or which the user wants to get combined together can be combined together into a single digest movie file, and therefore, a more favorable digest movie can be generated.

In one embodiment, the controller 210 is configured to save the chapter on a digest movie file that has been newly generated if no digest movie files have been written on the storage medium yet, or if a digest movie file has already been written on the storage medium but if the chapter generated is not related to the existent digest movie file, or if a digest movie file has already been written on the storage medium but if the user decides not to add the chapter. According to such an embodiment, a plurality of chapters that are not related to each other or that the user does not want to get combined together are saved on multiple different digest movie files separately, and therefore, a more favorable digest movie can be generated.

In another embodiment, if a relation between the chapter generated and the digest movie file that has been written on the storage medium satisfies a condition that has been set by the user, then the controller 210 decides that the digest movie file be related to the chapter generated. In that case, the condition may be set by making the user select at least one of multiple different modes. According to such an embodiment, the user can set a condition on which the decision is made whether or not the chapter generated should be added to the existent digest movie file. As a result, a digest movie file can be generated so as to respect the user's preference more fully.

In still another embodiment, the controller 210 determines, by reference to shooting information that is associated with the chapter, whether or not any digest movie file related to the chapter has been written on the storage medium yet. According to such an embodiment, a split decision can be made flexibly according to the condition during the shooting session.

In this particular embodiment, the shooting information may include information about a shooting mode in which the chapter was shot. According to such an embodiment, the controller 210 can combine a plurality of chapters, of which the shooting modes (such as the travel mode or the baby mode) are either the same or related to each other, into a single digest movie file. As a result, a digest movie representing a record of a particular travel or some baby's growth can be generated easily.

In another embodiment, the shooting information may include geographic information indicating a location where the chapter was shot. According to such an embodiment, a different digest movie can be generated according to the shooting location. As a result, digest movies can be generated on a travel destination basis or a different digest movie can be generated every time the user leaves his or her home area to go on a trip.

In still another embodiment, the shooting information may include information about a particular subject which is included in a movie represented by the chapter. According to such an embodiment, a digest movie featuring a particular person or animal can be generated easily.

In yet another embodiment, the shooting information may include information about the date and time when the chapter was shot. According to such an embodiment, a digest movie in which chapters with close shooting dates are combined together can be generated easily.

In yet another embodiment, the controller 210 is configured not to add the chapter to the digest movie file that has already been written on the storage medium if the total running time of the chapter is shorter than a first preset time. In yet another embodiment, the controller 210 is configured not to add the chapter to the digest movie file if a time interval between a point in time when the shooting instruction was given this time and a point in time when the shooting instruction was given to shoot the chapter last time is shorter than a second preset time. According to such embodiments, it is possible to avoid adding either too short a chapter or a chapter which has been generated just shortly after the previous chapter to the digest movie file.

In yet another embodiment, if any digest movie file has already been written on the storage medium, the controller 210 presents, on a display, a dialog box that prompts the user to decide whether or not to add the chapter to the existent digest movie file. If he or she decides to add it, the controller 210 adds the chapter to the existent digest movie file. In this particular embodiment, if multiple digest movie files have already been written on the storage medium, the controller 210 presents, on a display, a dialog box that prompts the user to choose one of those digest movie files which he or she wants to add the chapter to. And if he or she decides to add the chapter to a particular one of the digest movie files, the controller 210 adds the chapter to the particular digest movie file chosen. According to such embodiments, a more favorable digest movie can be generated so as to respect the user's preference more closely.

Embodiment 2

In the first embodiment described above, a digest movie file is supposed to be generated with only one digital camera 100. In the second embodiment to be described below, a digest movie file is generated by using a plurality of digital cameras 100.

2-1. Configuration of Digital Cameras

In this embodiment, a single digest movie file is generated by a plurality of digital cameras. As each of the digital cameras according to this embodiment has the same appearance and same electrical configuration as its counterpart of the first embodiment that has already been described with reference to FIGS. 1 through 3, its description will be omitted herein. Also, since the digital cameras of this embodiment have the same configuration as its counterpart of the first embodiment, any pair of components of those cameras having substantially the same function will be identified in the following description by the same reference numeral. Also, in the example to be described below, two digital cameras are supposed to be used for convenience sake, one of the two digital cameras 100 will be identified herein by 100M (where M means "master"), and the other digital camera 100 will be identified herein by 100S (where S means "slave"). These signs M and S will be added to the reference numerals of those digital cameras' components, too.

2-2. Operation

In this embodiment, a chapter that has been generated by one digital camera 100S is transferred to the other digital camera 100M, where a digest movie is generated. The digital camera 100M performs the digest movie recording operation in the same way as in the first embodiment described above, except that the digital camera 100M gets some chapters from the digital camera 100S in order to generate a digest movie.

FIG. 18 is a sequence diagram showing the procedure in which the two digital cameras generate a digest movie. In FIG. 18, the operations of the two digital cameras 100M and 100S are shown in parallel.

First of all, the two digital cameras 100M and 100S establish a communication link between them using their communications interfaces 250M and 250S (in Step S460). In this processing step, irrespective of their master-slave relationship in generating a digest movie, any of these two digital cameras 100M and 100S may initiate and control the communication session between them.

When the communication link is established, each of the digital cameras 100M and 100S may perform a shooting session and generate a chapter. First of all, it will be described how the digital camera 100M performs a digest movie shooting session.

The digital camera 100M performs the digest movie shooting session (in Steps S461 through S464) in the same way as in the first embodiment (see FIG. 9).

Specifically, first of all, on accepting the instruction that the user has entered by pressing the release button, the digital camera 100M generates a still picture and a chapter (in Step S461). Next, the digital camera 100M makes a split decision to decide whether the chapter that has been generated in the previous processing step S461 should be added to an existent digest movie file or another digest movie file should be newly generated (in Step S462). The split decision in this processing step S462 may be made in any of the various manners that have already been described for the first embodiment.

Subsequently, in accordance with the result of the split decision that has been made in the previous processing step S462, the digital camera 100M adds the chapter that has been generated in Step S461 to the digest movie file in the memory card 221M (in Step S463). Finally, the digital camera 100M updates the management database (in Step S464) to complete the digest movie recording operation.

Hereinafter, it will be described how the digital camera 100S performs a digest movie shooting session.

First of all, on accepting the instruction that the user has entered by pressing the release button, the digital camera 100S shoots a still picture and a chapter (in Step S465). Next, the digital camera 100S transmits the chapter that has been shot in Step S465 and management information about that chapter to the digital camera 100M via its communications interface 100S (in Step S466). As already described with reference to FIG. 7, the management information includes at least one of information about the shooting mode in which the chapter was shot, information about the subject included at least in the chapter, and information about the geographic location at which the chapter was shot.

On receiving the chapter and the management information about that chapter, the digital camera 100M makes a split decision to decide whether the chapter should be added to an existent digest movie file or another digest movie file should be newly generated (in Step S467). In this processing step, the split decision may be made under the same condition as in the processing step S462. Also, in this processing step, the split decision is made based on the management information of the chapter that has been gotten from the digital camera 100S.

Subsequently, in accordance with the result of the split decision that has been made in the previous processing step S467, the digital camera 100M adds the chapter that has been gotten from the digital camera 100S in Step S466 to the digest movie file in the memory card 221M (in Step S468). Finally, the digital camera 100M updates the management database (in Step S469) to complete the digest movie recording operation.

FIG. 19 is a sequence diagram showing another exemplary digest movie generation processing that uses multiple digital cameras. In FIG. 19, the operations of the two digital cameras 100M and 100S are shown in parallel.

First of all, the two digital cameras 100M and 100S establish a communication link between them using their communications interfaces 250M and 250S (in Step S470). In this processing step, irrespective of their master-slave relationship in generating a digest movie, any of these two digital cameras 100M and 100S may initiate and control the communication session between them.

After the communication link has been established, the digital cameras 100M and 100S share a split condition, which may be one or a combination of the split decision conditions that have already been described for the first embodiment. That split condition may get shared by sending the split condition from the digital camera 100M to the digital camera 100S, or vice versa, using their communications interfaces 250M and 250S. Alternatively, the user may set the split condition by him- or herself using the operating sections of the digital cameras 100M and 100S.

Once the split condition has gotten shared, each of the digital cameras 100M and 100S may perform a shooting session and generate a chapter. First of all, it will be described how the digital camera 100M performs a digest movie shooting session.

The digital camera 100M performs the digest movie shooting session (in Steps S472 through S475) in the same way as in the first embodiment (see FIG. 9).

Specifically, first of all, on accepting the instruction that the user has entered by pressing the release button, the digital camera 100M shoots a still picture and a chapter (in Step S472). Next, the digital camera 100M makes a split decision to decide whether the chapter that has been generated in the previous processing step S472 should be added to an existent digest movie file or another digest movie file should be newly generated (in Step S473). The controller 210M of the digital camera 100M makes the split decision in this processing step S473 in accordance with the split condition that has gotten shared with the digital camera 100S in Step S471.

Subsequently, in accordance with the result of the split decision that has been made in the previous processing step S473, the digital camera 100M adds the chapter that has been generated in Step S472 to the digest movie file in the memory card 221M (in Step S474). Finally, the digital camera 100M updates the management database (in Step S475) to complete the digest movie recording operation.

Hereinafter, it will be described how the digital camera 100S performs a digest movie shooting session.

First of all, on accepting the instruction that the user has entered by pressing the release button, the digital camera 100S shoots a still picture and a chapter (in Step S476). Next, the controller 210S of the digital camera 100S makes a split decision of Step S477 based on the split condition that has gotten shared with the digital camera 100M in Step S471.

Subsequently, the controller 210S of the digital camera 100S transmits the chapter that has been shot in Step S476 and the result of the split decision that has been made on that chapter to the digital camera 100M via its communications interface 100S (in Step S478). The result of the split decision to be transmitted in Step S478 is a piece of information indicating whether the split condition that has gotten shared with the digital camera 100M in Step S471 is satisfied or not. For example, suppose the split condition that has gotten shared in Step S471 says that any chapter that has been shot with the travel mode ON should be added to the same digest movie file. In that case, in Step S477, the controller 210S of the digital camera 100S determines whether or not the chapter generated has been shot with the travel mode ON. If the answer is YES, the controller 210S of the digital camera 100S notifies the digital camera 100M in Step S478 of the information indicating whether or not the chapter to transmit satisfies the split condition that has gotten shared in Step S471. It should be noted that the result of the split decision to be sent from the digital camera 100S to the digital camera 100M in Step S478 may be information explicitly indicating that the split condition that has gotten shared in Step S471 is satisfied. Optionally, the information does not have to be such explicit information but may also be zero or one as long as the information can indicate that the digital camera 100M satisfies the split condition that has gotten shared in Step S471.

Subsequently, in accordance with the result of the split decision that has been provided by the digital camera 100S, the digital camera 100M adds the chapter that has been gotten from the digital camera 100S to the digest movie file in the memory card 221M (in Step S479). If the result of the split decision provided says that the file should not be split, then another digest movie file is newly generated without adding the chapter. Finally, the digital camera 100M updates the management database (in Step S480) to complete the digest movie recording operation.

In the examples illustrated in FIGS. 18 and 19, if the communications are carried out using, as the communications interfaces 250, a wired LAN, a wireless LAN, an infrared communications device, or a Bluetooth™ device, a chapter that has just been shot by the digital camera 100S can be transmitted to the digital camera 100M right away. In this manner, the digital camera 100M can add a chapter that has been gotten substantially in real time from the other digital camera 100S right after it has been shot to the existent digest movie file. As a result, even a plurality of chapters that have been generated by multiple digital cameras 100M and 100S can also be arranged time sequentially to form a single digest movie file easily.

Also, in the examples illustrated in FIGS. 18 and 19, the chapter that has been shot by the digital camera 100S does not have to be transmitted to the digital camera 100M using a wired LAN, a wireless LAN, an infrared communications device or a Bluetooth™ device but may also be handed using a removable memory card 221 as a medium. In that case, after the digital camera 100S has written a digest movie file including at least one chapter on the memory card 221, the memory card 221 may be attached and handed to the digital camera 100M. And one or more chapters selected from the digest movie file that the digital camera 100S has written on the memory card 221 may be added at a time to the digest movie file that is stored in the flash memory 222 of the digital camera 100M. In that case, the master does not have to be the digital camera 100M but may also be any other electronic device (or image processing apparatus) such as a personal computer or a server computer. Optionally, the flash memory 222 may be replaced with a hard disk drive.

2-3. Effects

As described above, a digital camera 100M according to this embodiment includes a communications interface 250 which is configured to get, from a digital camera 100S that is another device, movie data which has been generated for a preset period of time in response to a shooting instruction that has been given by a user, and a controller 210 which is configured to write the chapter generated on a storage medium such as a memory card 221. If any digest movie file has already been written on the storage medium and if the chapter generated is related to the existent digest movie file, or if the user decides to add the chapter generated, the controller 210 just adds the chapter generated to the existent digest movie file. That is to say, the digital camera 100M can write a digest movie that has been generated by the other digital camera 100S on the memory card 221 as a single digest movie file. As a result, the user can enjoy, as a single movie file, a digest movie comprised of chapters that have been shot with multiple digital cameras. For example, if multiple digital cameras according to this embodiment are used for an event such as a field day, the user can enjoy a multi-viewpoint digest movie as a single movie file.

Other Embodiments

Although Embodiments 1 and 2 have been described herein as just examples of the techniques of the present disclosure, various modifications, replacements, additions or omissions can be readily made on those embodiments as needed and the present disclosure is intended to cover all of those variations. Also, a new embodiment can also be created by combining respective elements that have been described for those Embodiments 1 and 2 disclosed herein.

Thus, other embodiments of the present disclosure will be described as an example.

In the first and second embodiments described above, if no digest movie has been written yet on a memory card, a digest movie file is supposed to be newly generated. However, this is just an example. That is to say, actually chapters do not have to be saved on multiple digest movie files separately. Alternatively, the chapters may be classified logically according to the split condition in the same digest movie file and may be saved on multiple different sections. Also, if the decision has been made as a result of the split decision that a chapter newly generated should not be added to any existent digest movie file, the newly generated chapter may be discarded.

Also, even though two digital cameras are supposed to be used in the second embodiment described above, similar processing may be carried out using three or more digital cameras. In that case, the processing shown in FIGS. 18 and 19 may be carried out by using one of the three or more digital cameras as master and the others as slaves, respectively.

In the embodiments described above, in the digest movie recording mode, movie data is written continuously on the buffer memory 205 and movie data (chapter) that will form a digest movie is supposed to be generated for a predetermined period of time in response to an instruction to shoot a still picture as a trigger. However, this is only an example of the technique of the present disclosure. Optionally, the image capture device does not have to have the ability to write movie data continuously on the buffer memory 205, and the movie data (chapter) may be generated in response to an instruction to generate a chapter independently of shooting a still picture.

Also, in the embodiments described above, the technique of the present disclosure is supposed to be applied to the digital camera (image capture device) 100. However, the technique of the present disclosure is applicable to not just an image capture device but also an image processing apparatus with the functions of the image processor 203 and the controller 210 as well. Such an image processing apparatus may have the same configuration as the image processor 203 and controller 210 shown in FIG. 3, for example, and may operate as shown in FIGS. 8 to 15 or in FIGS. 17 to 19. That image processing apparatus may get later either movie data (chapter) that has been generated with a camera and written on a storage medium or movie data (chapter) to be transmitted over telecommunications lines and may subject the movie data to the processing described above and write the data on a digest movie file.

The technique of the present disclosure is also applicable to software (program) that defines the processing described above. The operation defined by such a program is as shown in FIGS. 8 to 15 or FIGS. 17 to 19, for example. Such a program may be distributed by being stored in a removable storage medium and may also be downloaded over telecommunications lines. By making a processor built in a computer execute such a program, the various operations of the embodiments described above can be carried out.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The technique of the present disclosure is implementable as not only the digital camera 100 but also any other kind of image capture device such as a movie camera, a cellphone with camera, a wearable camera or a surveillance camera or an information processing apparatus such as a personal computer or a server computer.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-057029 filed Mar. 14, 2012, and No. 2013-019340 filed Feb. 4, 2013, the entire contents of which are hereby incorporated by reference.

What is claimed is:

1. An image processing apparatus, comprising:
   an image processor configured to generate movie data based on image capturing data obtained in response to a shooting instruction that has been given by a user; and
   a controller configured to write the movie data on a storage medium, wherein when any movie file has already been written on the storage medium, and when the movie data is related to the existent movie file, the controller adds the movie data to the existent movie file,
   wherein the controller is configured not to add the movie data to the movie file that has already been written on the storage medium, when a first condition that the total running time of the movie data is shorter than a first preset time is satisfied, or when a second condition that a time interval between a point in time when the shooting instruction is given this time and a point in time when the shooting instruction was given to obtain the movie data last time is shorter than a second preset time is satisfied, and the controller is configured to add the movie data to the movie file that has already been written on the storage medium when the first condition is not satisfied and when the second condition is not satisfied.

2. The image processing apparatus of claim 1, wherein the controller is configured to write the movie data on a movie file that has been newly generated
   when no movie files have been written on the storage medium yet, or
   when a movie file has already been written on the storage medium but when the movie data is not related to the existent movie file, or
   when a movie file has already been written on the storage medium but when the user decides not to add the movie data.

3. The image processing apparatus of claim 1, wherein when a relation between the movie data and the movie file that has been written on the storage medium satisfies a condition that has been set by the user, then the controller decides that the movie file be related to the movie data.

4. The image processing apparatus of claim 3, wherein the condition is set by making the user select at least one of multiple different modes.

5. The image processing apparatus of claim 1, wherein the controller is configured to determine, by reference to shooting information that is associated with the movie data, whether or not any movie file related to the movie data has been written on the storage medium yet.

6. The image processing apparatus of claim 5, wherein the shooting information includes information about a shooting mode in which the movie data was obtained by shooting.

7. The image processing apparatus of claim 5, wherein the shooting information includes geographic information indicating a location where the movie data was obtained by shooting.

8. The image processing apparatus of claim 5, wherein the shooting information includes information about a particular subject which is included in a movie represented by the movie data.

9. The image processing apparatus of claim 5, wherein the shooting information includes information about the date and time when the movie data was obtained by shooting.

10. An image capture device comprising:
    the image processing apparatus of claim 1; and
    an image capturing section configured to generate image capturing data in response to a shooting instruction that has been given by a user and to output the image capturing data to the image processing apparatus.

11. An image processing apparatus, comprising
    an interface configured to obtain, from another device, movie data that has been generated in response to a shooting instruction that has been given by a user; and
    a controller configured to write the movie data on a storage medium, wherein when any movie file has already been written on the storage medium, and when the movie data is related to the existent movie file, the controller adds the movie data to the existent movie file,
    wherein the controller is configured not to add the movie data to the movie file that has already been written on the storage medium, when a first condition that the total running time of the movie data is shorter than a first preset time is satisfied, or when a second condition that a time interval between a point in time when the shooting instruction is given this time and a point in time when the shooting instruction was given to obtain the movie data last time is shorter than a second preset time is satisfied, and the controller is configured to add the movie data to the movie file that has already been written on the storage medium when the first condition is not satisfied and when the second condition is not satisfied.

12. An image capture device comprising:
    the image processing apparatus of claim 11; and
    an image capturing section configured to generate image capturing data in response to a shooting instruction that has been given by a user and to output the image capturing data to the image processing apparatus.

* * * * *